(12) United States Patent
Blomberg

(10) Patent No.: US 10,258,195 B2
(45) Date of Patent: Apr. 16, 2019

(54) BARBEQUE GRILL AND OVEN

(71) Applicant: Jim Blomberg, Loomis, CA (US)

(72) Inventor: Jim Blomberg, Loomis, CA (US)

(*) Notice: Subject to any disclaimer, the term of this patent is extended or adjusted under 35 U.S.C. 154(b) by 196 days.

(21) Appl. No.: 15/262,870

(22) Filed: Sep. 12, 2016

(65) Prior Publication Data
US 2016/0374509 A1    Dec. 29, 2016

Related U.S. Application Data

(63) Continuation-in-part of application No. 13/853,848, filed on Mar. 29, 2013, now Pat. No. 9,439,536.

(51) Int. Cl.
*A47J 37/07* (2006.01)
*A23B 4/052* (2006.01)
*A23B 4/044* (2006.01)

(52) U.S. Cl.
CPC ........... *A47J 37/0704* (2013.01); *A23B 4/044* (2013.01); *A23B 4/052* (2013.01); *A23B 4/0523* (2013.01); *A47J 37/0786* (2013.01)

(58) Field of Classification Search
CPC . A47J 37/0704; A47J 37/0786; A23B 4/0523; A23B 4/052
USPC ......... 99/482, 467, 473, 474, 476, 481, 468; 126/25 R
See application file for complete search history.

(56) References Cited

U.S. PATENT DOCUMENTS 2,746,377 A   5/1956 Parks
3,081,692 A * 3/1963 Sorensen ............... A23B 4/052
                                          126/9 R
4,233,890 A   11/1980 Jansen
4,664,026 A   5/1987 Milloy
4,665,891 A * 5/1987 Nemec ............... A47J 37/0704
                                          126/25 R (Continued)

FOREIGN PATENT DOCUMENTS

DE         20303004      7/2003
WO    WO/2012/120553 A1  9/2012

OTHER PUBLICATIONS

H000813; U.S. Statutory Invention Registration, publ. Sep. 4, 1990, Combined Smoker/Cooker Unit, Ragon.

*Primary Examiner* — Reginald Alexander
(74) *Attorney, Agent, or Firm* — Inventive Law Inc.; Jim H. Salter

(57) ABSTRACT

A barbeque grill and oven or food smoker having an offset firebox configuration is disclosed. Example embodiments include: an oven having an enclosed interior region for cooking food items; an offset firebox sharing at least a portion of a side of the oven, the offset firebox having a first opening over which a removable grill may be placed, the firebox having a second opening through which airflow may travel from the firebox into the oven; an oven lid configured to produce an opening in the top of the oven of any desired size, the opening of the oven lid causing an increase in the flow of heated air from the firebox into the oven; and a controller coupled to a temperature sensor and an airflow conduit, the temperature sensor being terminated at a location in the oven to sense a temperature in the oven, the conduit being terminated at the offset firebox to deliver an airflow to stoke a fire in the offset firebox, the controller being configured to automatically generate an airflow in the conduit to drive the temperature in the oven to a desired temperature.

20 Claims, 19 Drawing Sheets

(56) References Cited

U.S. PATENT DOCUMENTS

| | | | | |
|---|---|---|---|---|
| 4,700,618 | A | 10/1987 | Cox | |
| 4,850,333 | A | 7/1989 | Dellrud | |
| 4,934,260 | A | 6/1990 | Blevins | |
| 5,195,423 | A | 3/1993 | Beller | |
| 5,437,222 | A | 8/1995 | Franklin | |
| 5,588,355 | A * | 12/1996 | Mead | A23B 4/052 99/449 |
| 5,653,162 | A | 8/1997 | Lunde | |
| 5,865,099 | A | 2/1999 | Waugh | |
| 6,038,964 | A * | 3/2000 | Sikes | A47J 37/07 126/25 R |
| 6,102,028 | A | 8/2000 | Schlosser | |
| 6,142,066 | A | 11/2000 | Anders | |
| 6,820,538 | B2 | 11/2004 | Roescher | |
| 7,004,063 | B1 | 2/2006 | Li | |
| 7,159,509 | B2 | 1/2007 | Starkey | |
| 7,624,675 | B2 | 12/2009 | Galdamez | |
| 8,092,850 | B2 | 1/2012 | Marr | |
| 8,122,818 | B2 | 2/2012 | Oberlander | |
| 8,304,696 | B2 * | 11/2012 | Knight | F24C 15/322 126/21 A |
| 9,204,657 | B2 * | 12/2015 | Cusack | A23B 4/044 |
| 9,439,536 | B2 | 9/2016 | Blomberg | |
| 2003/0150336 | A1 | 8/2003 | Roescher | |
| 2004/0237801 | A1 | 12/2004 | Starkey | |
| 2006/0254433 | A1 | 11/2006 | Oberlander | |
| 2007/0028914 | A1 | 2/2007 | Galdamez | |
| 2008/0098902 | A1 | 5/2008 | Mansfield | |
| 2008/0098906 | A1 | 5/2008 | Davis | |
| 2008/0168979 | A1 | 7/2008 | Goehring | |
| 2009/0314285 | A1 | 12/2009 | Marsh | |
| 2010/0263654 | A1 | 10/2010 | Cusack | |
| 2012/0012096 | A1 | 1/2012 | Cusack | |
| 2014/0007778 | A1 | 1/2014 | Marks | |
| 2014/0290497 | A1 | 10/2014 | Blomberg | |

* cited by examiner

BARBEQUE GRILL AND OVEN

This is a continuation-in-part patent application drawing priority from U.S. patent application Ser. No. 13/853,848; filed Mar. 29, 2013. This present patent application draws priority from the referenced patent application. The entire disclosure of the referenced patent application is considered part of the disclosure of the present application and is hereby incorporated by reference herein in its entirety.

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the disclosure herein and to the drawings that form a part of this document: Copyright 2012-2016, Jim Blomberg, All Rights Reserved.

Technical Field

This disclosure relates to barbeques, ovens, smokers, or food cooking assemblies, and more specifically to a combination barbeque grill and oven or food smoker having an offset firebox configuration.

Related Art

Barbeque grills or grilling assemblies are popular devices for cooking meats, fish, vegetables, or the like. Similarly, fire-heated ovens or smokers are popular devices for slowly cooking food and infusing the cooked food with a desired smoky flavor. However, the configuration of most available grills with food smokers disadvantageously causes uneven smoking and cooking of food on the grill or within the smoker, thus making their use inefficient, impractical and problematic. As a result, operators of such grills are often forced to either continually rotate their meats to ensure even cooking and smoking thereof, or to cook their meats within a central area on the grilling grate or the smoking chamber where cooking temperature is more acceptable, thereby significantly reducing otherwise useable grill space. Additionally, conventional systems cannot be conveniently configured to adjust the temperature in the cooking area to a desired level. Therefore, there is a need for a combination grill and food smoker that provides a configurable and consistent dispersion of heat and smoke throughout the cooking area of the grill and the smoker.

BRIEF DESCRIPTION OF THE DRAWINGS

Embodiments illustrated by way of example and not limitation in the figures of the accompanying drawings, in which.

DETAILED DESCRIPTION

A barbeque grill and oven or food smoker having an offset firebox configuration is disclosed. However, it is understood that embodiments may be practiced without these specific details. In other instances, well-known processes, structures and techniques have not been shown in detail in order not to obscure the clarity of this description. Various embodiments are described below in connection with the figures provided herein.

Description of an Example Embodiment

Figure 1:
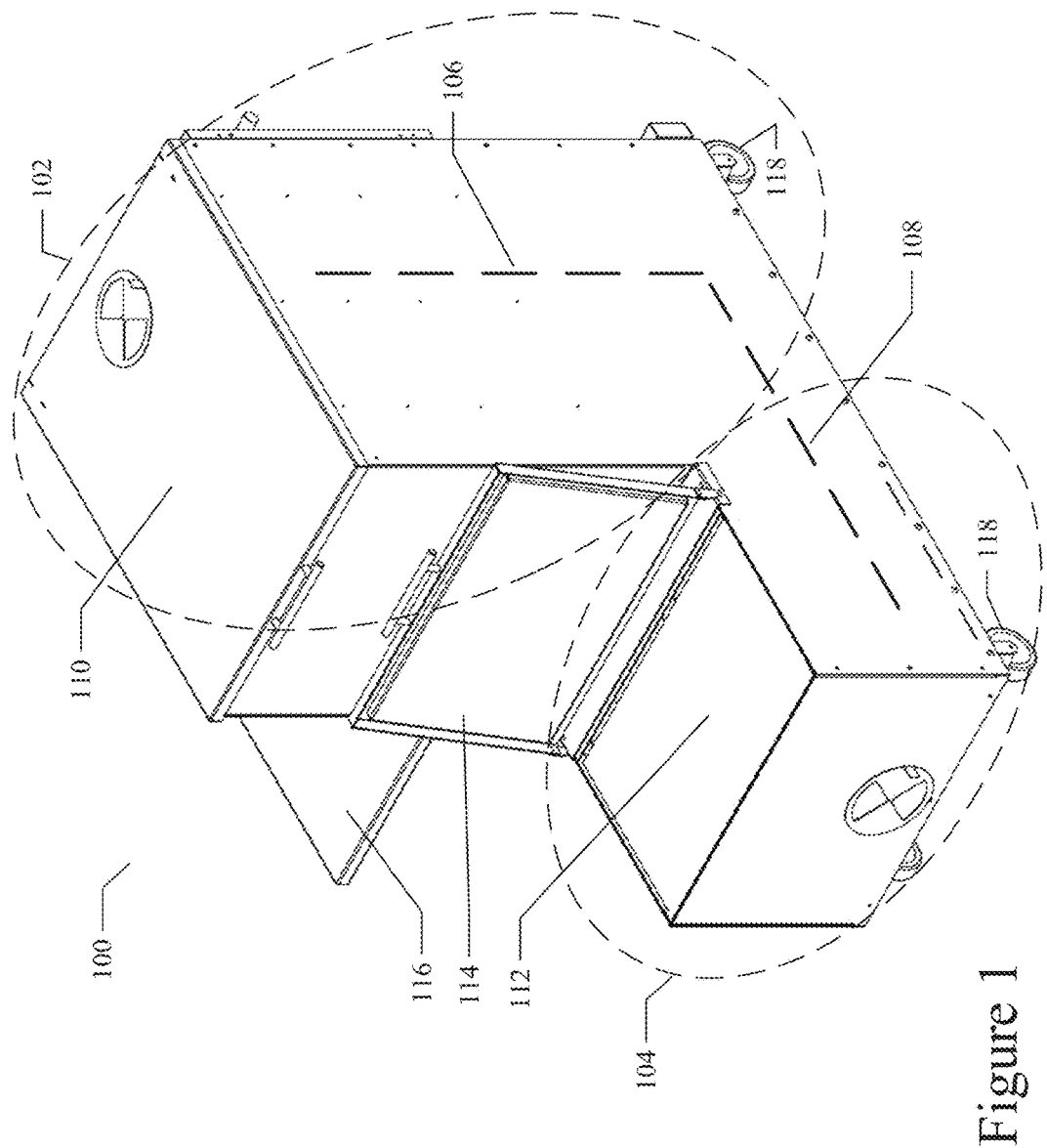
FIG. 1 illustrates a front perspective view of an example embodiment with the oven lid in a closed position.

In the various embodiments described herein, a barbeque grill and oven or food smoker having an offset firebox configuration is provided. Referring now to FIG. 1, a particular embodiment 100 of the barbeque grill and oven or food smoker having an offset firebox configuration is illustrated. FIG. 1 illustrates a front perspective view of an example embodiment of the barbeque grill and oven 100 with the oven lid in a closed position. In general, the barbeque grill and oven 100 of an example embodiment comprises a mainly vertical oven or smoker portion 102 and a mainly horizontal grill and firebox portion 104. As shown in FIG. 1, the mainly vertical oven or smoker portion 102 is configured as a generally rectangular enclosure extending predominantly in a vertical direction as indicated by the vertical axis 106. As also shown in FIG. 1, the mainly horizontal grill and firebox portion 104 is configured as a generally rectangular enclosure extending predominantly in a horizontal direction as indicated by the horizontal axis 108. As such, the grill and firebox portion 104 can be considered offset from the vertical axis of the oven or smoker portion 102. In one example embodiment, the grill and firebox portion 104 can share at least a portion of a side of the oven or smoker portion 102, the offset grill and firebox portion 104 having a first opening over which a removable grill or grate may be placed, the grill and firebox portion 104 having a second opening through which airflow may travel from the grill and firebox portion 104 into the oven or smoker portion 102. When in use, as described in more detail below, the oven or smoker portion 102 provides an area or interior region in which food items can be arranged on one or more grills or hung from hooks and exposed to heat provided by a fire in a firebox of the grill and firebox portion 104. As such, the oven or smoker portion 102 provides an enclosure or enclosed interior region that can be used to bake, slow-cook, or smoke food items. For brevity, this enclosure will be denoted herein as the oven 102. The oven 102 includes an oven lid 110, which can be slid horizontally to expose the oven 102 to outside air. The oven lid 110 can be slid horizontally to any desired position to produce an opening in the top of the oven 102 of any desired size. As will be described in more detail below, this configurably sized opening in the top of the oven 102 can be used to configure the temperature in the oven 102 enclosure.

Referring still to FIG. 1, the grill and firebox portion 104 of the barbeque grill and oven 100 of an example embodiment includes a firebox 112 that provides a generally rectangular enclosure in which a fire can be started using wood, briquettes, pellets, or other types of fuels typically used in barbeques. In an alternative embodiment, propane gas can be used as a fuel source for the fire in the firebox 112. The grill and firebox portion 104 can also include a grill or grate 140 (see FIG. 10) that can be removably placed over the fire in the firebox 112. The grill 140 over the fire in the firebox 112 provides a heat-permeable surface that can be used to fry, sear, broil, grill, or fast-cook food items. In the example embodiment, the grill and firebox portion 104 can also include a grill cover 114 to cover the grill 140 and firebox 112 when the barbeque grill and oven 100 is not in use. In the example embodiment, the barbeque grill and oven 100 can include a foldable utility shelf 116 and wheels or rollers 118 to facilitate movement of the barbeque grill and oven 100.

Figure 2:
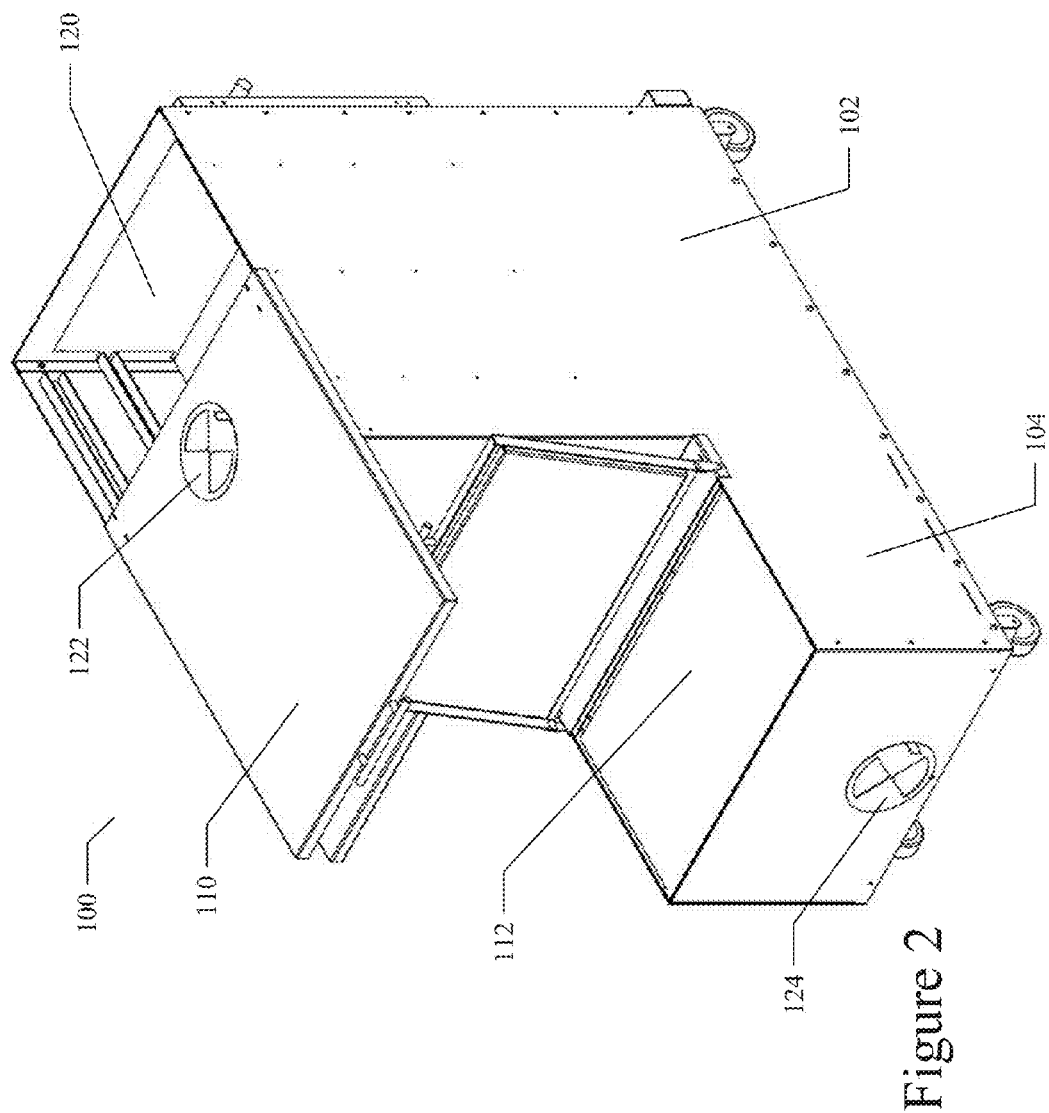
FIG. 2 illustrates a front perspective view of an example embodiment with the oven lid in an open position.

FIG. 2 illustrates a front perspective view of an example embodiment with the oven lid 110 in an open position. As a result of the oven lid 110 being slid to an open position as shown in FIG. 2, an opening 120 in the top of the oven 102 is produced. Depending on the distance that the oven lid 110 is horizontally slid, the size of the opening 120 can be configurably adjusted. The oven lid 110 can also be configured to include an adjustable vent opening 122 that can be opened or closed independently of the position of the oven lid 110. As a result, the features of the oven lid 110 provide a means for adjusting the quantity of air that can escape from the top of the oven 102. Additionally, the grill and firebox portion 104 can be configured to include an adjustable vent opening 124 that can be opened or closed to provide a means for adjusting the quantity of air that can enter the firebox 112. The opening on the top of the firebox 112 also provides a means for outside air to enter the firebox 112 and feed the fire therein. Additionally, opening on the top of the firebox 112 provides a means for outside air to enter the firebox 112 and flow through to the oven 102 via an opening between the firebox 112 and the oven 102, if the oven lid 110 is open or the vent 122 is open. As described in more detail below, this airflow between the firebox 112 and the oven 102 enables the heat generated in the firebox 112 to be configurably transferred to the oven 102.

Figure 3:
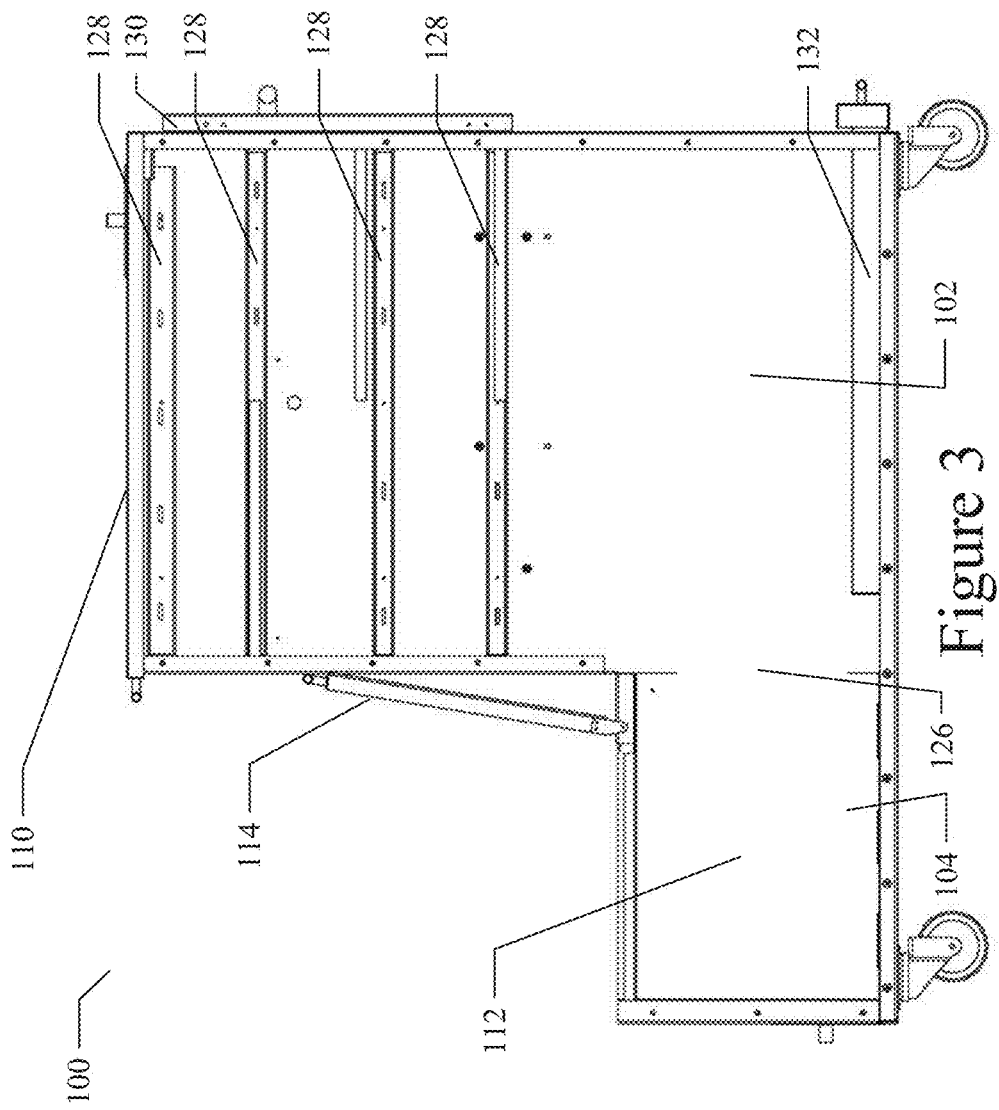
FIG. 3 illustrates a side view of an example embodiment with the oven lid in a closed position and the near side of the barbeque grill and oven rendered transparently.

FIG. 3 illustrates a side view of an example embodiment with the oven lid in a closed position and the near side of the barbeque grill and oven 100 rendered transparently. As shown, an opening 126 between the firebox 112 and the oven 102 provides a means for airflow between the firebox 112 and the oven 102, if the oven lid 110 is open or the vent 122 is open. FIG. 3 also shows the rack supports 128, which can be used to support one or more removable grills, grates, or racks in the interior enclosure of the oven 102. The removable grills, grates, or racks can be used to place food items thereon, which can be cooked or smoked in the oven 102. These rack supports 128 can also be used to support hangars, which can be used to hang food items from hooks within the interior enclosure of the oven 102. A door 130 is also provided to enable access to the interior of the oven 102 from the rear of the oven 102. In one embodiment, the door 130 is hinged at the lower edge to enable the door 130 to open outwardly and downwardly. A trap drawer 132 is provided at the bottom of the oven 102 to catch drippings and the like that may drop from food items cooking in the oven 102. The trap drawer 132 can be slid outwardly and removed for emptying.

Figure 4:
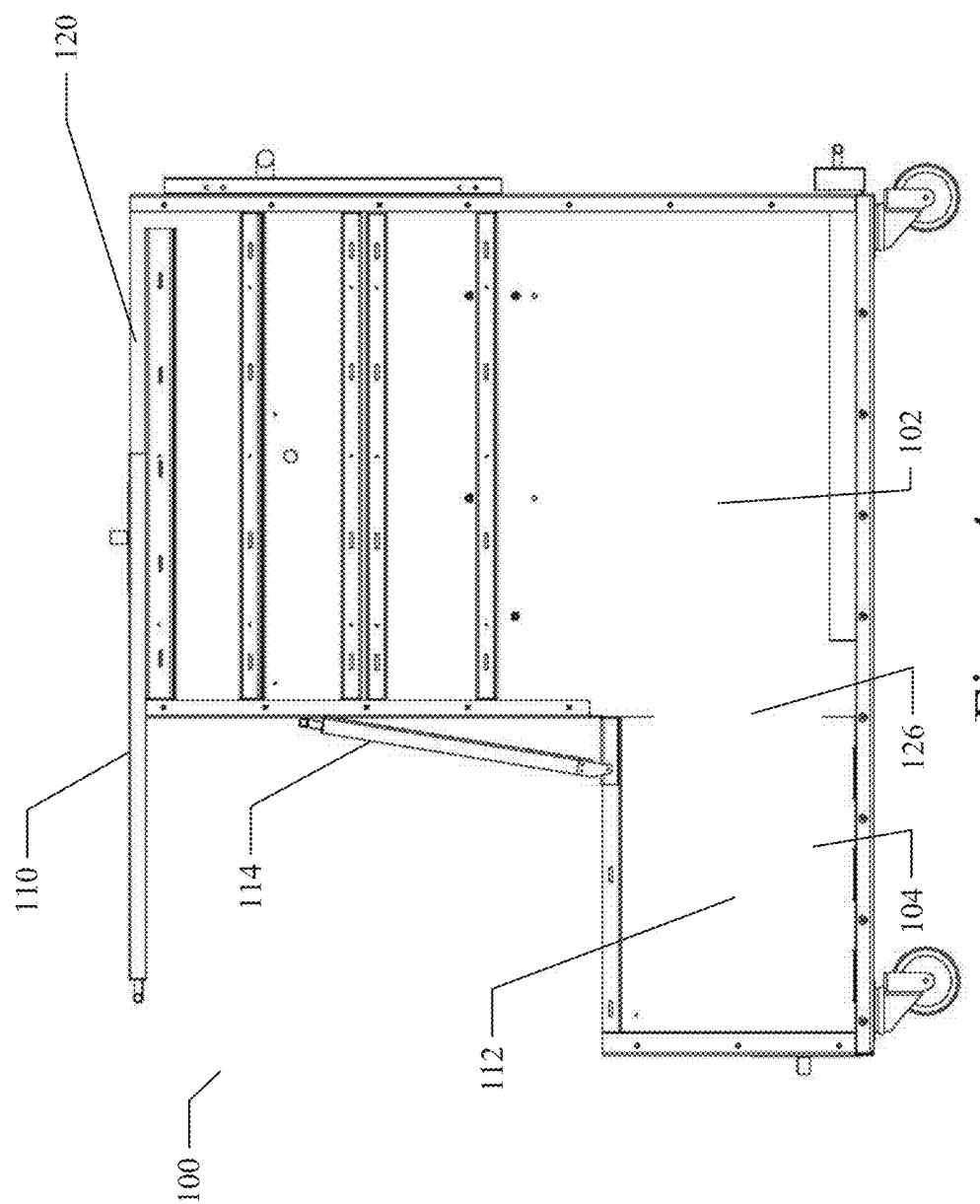
FIG. 4 illustrates a side view of an example embodiment with the oven lid in an open position and the near side of the barbeque grill and oven rendered transparently.

FIG. 4 illustrates a side view of an example embodiment with the oven lid in an open position and the near side of the barbeque grill and oven 100 rendered transparently. As shown, an opening 126 between the firebox 112 and the oven 102 provides a means for airflow between the firebox 112 and the oven 102, if the oven lid 110 is open or the vent 122 is open. Given the open oven lid 110 shown in FIG. 4, an opening 120 in the top of the oven 102 is produced. As a result, air and heat can flow from the firebox 112, through the opening 126, into the oven 102 and out of the oven 102 through the opening 120. Depending on the distance that the oven lid 110 is horizontally slid, the size of the opening 120 can be configurably adjusted and thus the quantity of the air flow into the oven 102 can be configurably adjusted. Additional details of the airflow features of the example embodiment are provided below in connection with FIGS. 7 and 8.

Figure 5:
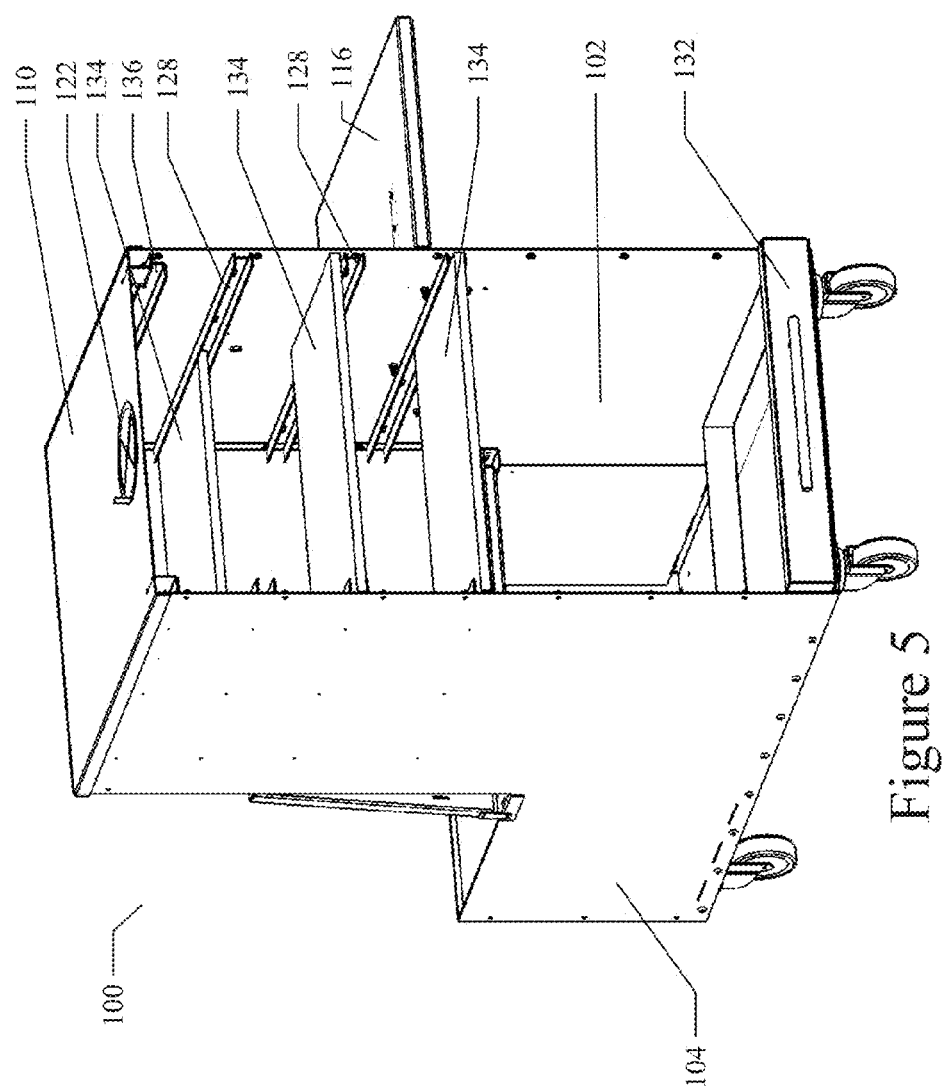
FIG. 5 illustrates a rear perspective view of an example embodiment with the oven lid in a closed position and the rear side of the barbeque grill and oven rendered transparently.

FIG. 5 illustrates a rear perspective view of an example embodiment with the oven lid 110 in a closed position and the rear side of the barbeque grill and oven 100 rendered transparently. The enclosure within oven 102 is shown to include the rack supports 128, which can be used to support one or more removable grills, grates, or racks 134 in the interior enclosure of the oven 102. In an alternative embodiment, the rack supports 128 can also be used to support hangars, which can be used to hang food items from hooks within the interior enclosure of the oven 102. In this case, the removable grills, grates, or racks 134 can be removed to make room for the hanging food items. In another configuration, a portion of the interior of the oven 102 can be used for hanging food items while another portion can be used with removable grills, grates, or racks 134. As a result, the oven 102 can support a wide variety of food items that can be cooked at the same time. The enclosure within oven 102 is also shown to include the lid slide supports 136, which can be used to support the oven lid 110 and to enable the oven lid 110 to be slid horizontally to expose opening 120, as shown in FIG. 6.

Figure 6:
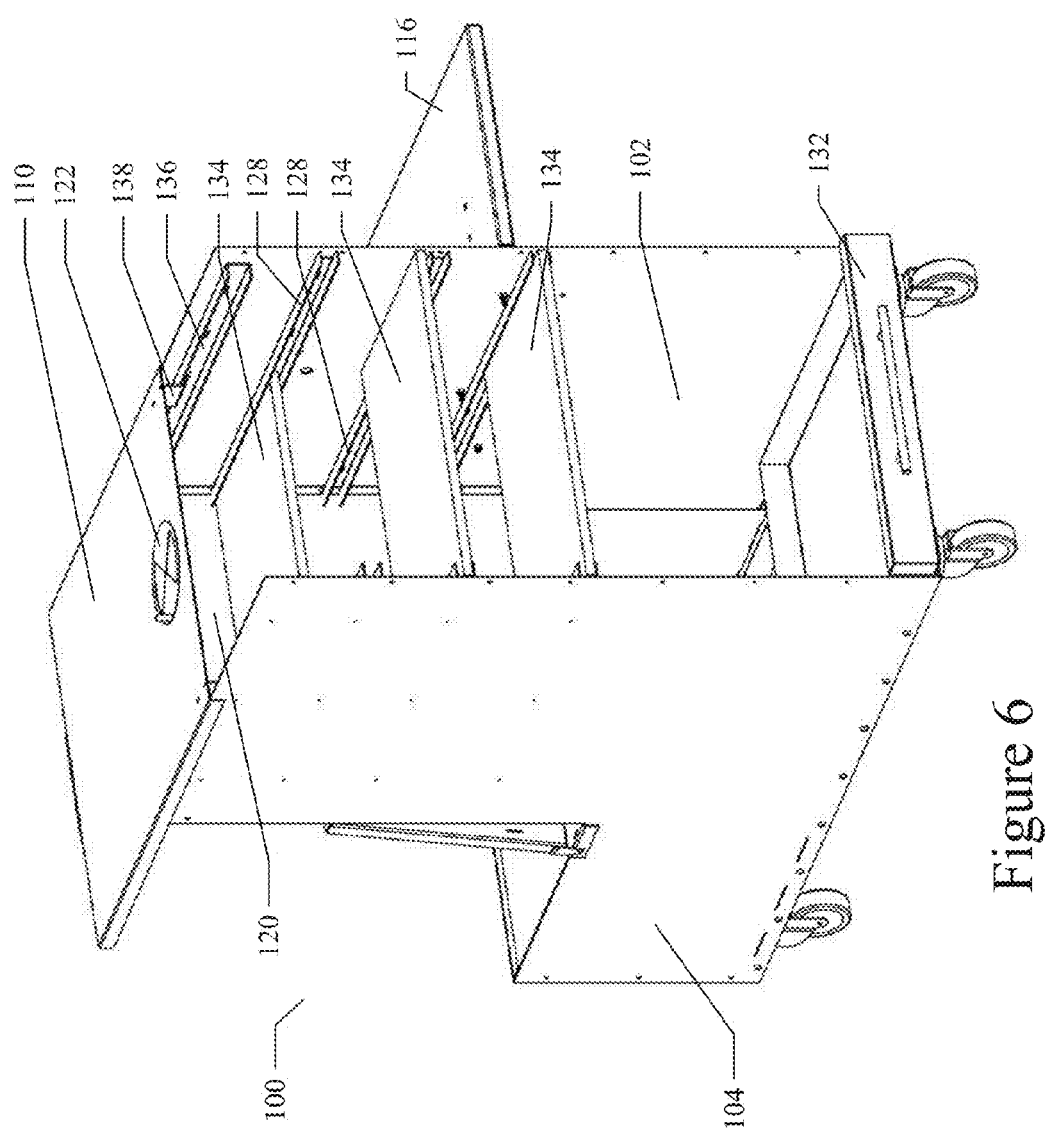
FIG. 6 illustrates a rear perspective view of an example embodiment with the oven lid in an open position and the rear side of the barbeque grill and oven rendered transparently.

FIG. 6 illustrates a rear perspective view of an example embodiment with the oven lid 110 in an open position and the rear side of the barbeque grill and oven 100 rendered transparently. As shown, the oven lid 110 has been slid horizontally along lid slide supports 136 to expose opening 120. A bracket 138 is provided on the underside of the oven lid 110 to engage the lid slide supports 136 and to enable the sliding of the oven lid 110 horizontally along lid slide supports 136.

Figure 7:
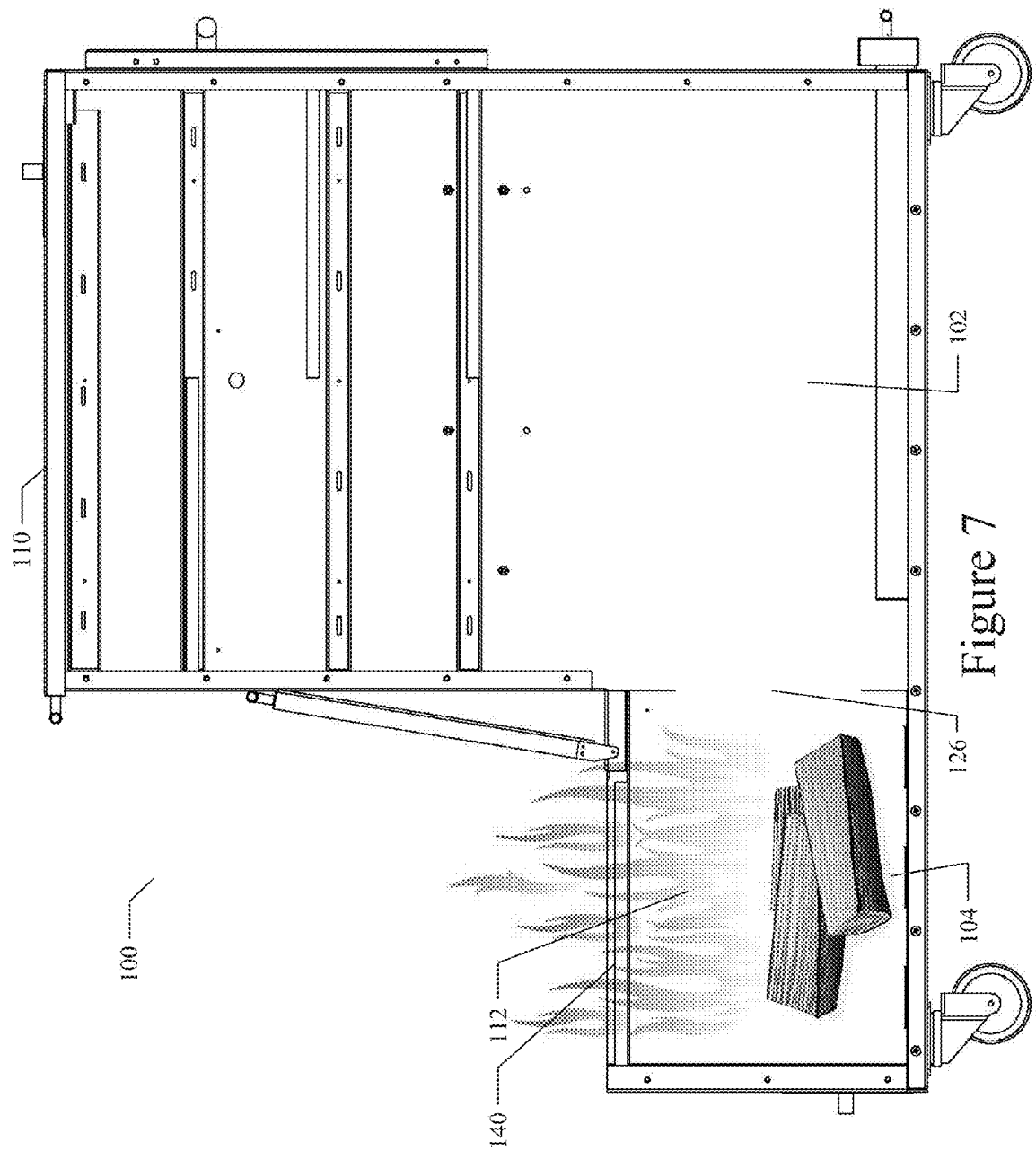
FIG. 7 illustrates a side view of an example embodiment with the oven lid in a closed position, the near side of the barbeque grill and oven rendered transparently, and a fire in the offset firebox wherein air flow through the oven is disabled.

FIG. 7 illustrates a side view of an example embodiment with the oven lid 110 in a closed position, the near side of the barbeque grill and oven 100 rendered transparently, and a fire in the offset firebox 112 wherein air flow through the oven 102 is disabled. As shown in FIG. 7, the fire in the offset firebox 112 generates a heated convection airflow extending outwardly as a result of the heat produced by the fire. Some of this heated airflow can travel into the oven 102 via the opening 126 between the firebox 112 and the oven 102. However, a minimal amount of this heated airflow travels into the oven 102, because the oven 102 is a closed space when the oven lid 110 is closed and the vent 122 is closed. As a result, when the oven lid 110 is closed and the vent 122 is closed, most of the heat generated by the firebox 112 escapes through the open top of the firebox 112 and the grill 140 resting thereon. Thus, when a user wants to grill food items on the grill 140 spanning the open top of the firebox 112, the oven lid 110 can be closed and the vent 122 can be closed to render a maximum amount of heat at the grill 140. In this configuration, the enclosure within the oven 102 is subjected to a minimal level of heat from the fire in firebox 112. This low level of heat may be beneficial for slow-cooking or smoking food items positioned in the oven 102.

Figure 8:
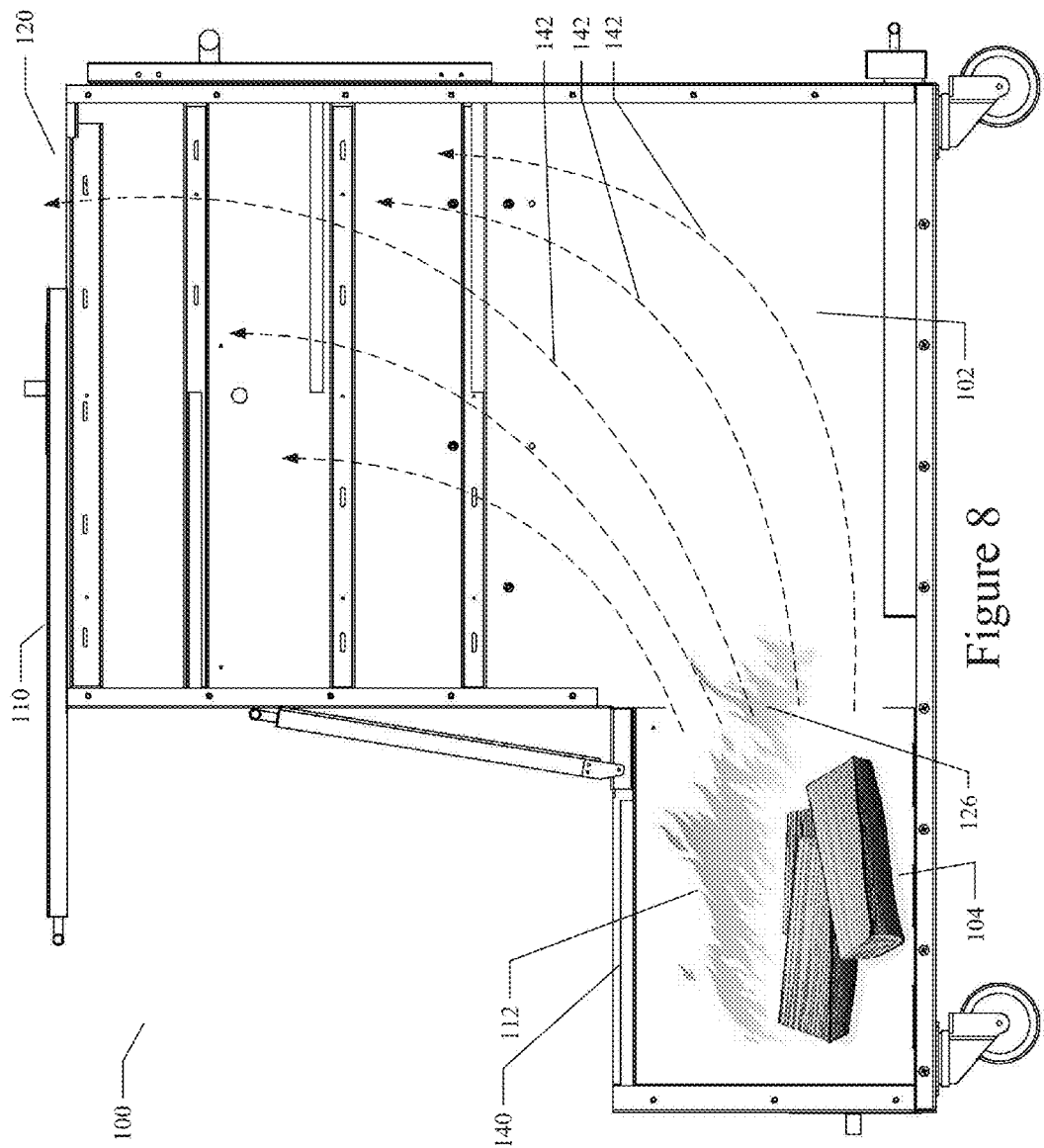
FIG. 8 illustrates a side view of an example embodiment with the oven lid in an open position, the near side of the barbeque grill and oven rendered transparently, and a fire in the offset firebox wherein air flow through the oven is enabled.

FIG. 8 illustrates a side view of an example embodiment with the oven lid 110 in an open position, the near side of the barbeque grill and oven 100 rendered transparently, and a fire in the offset firebox 112 wherein air flow through the oven 102 is enabled. In the configuration of the barbeque grill and oven 100 shown in FIG. 8, the oven lid 110 and/or the vent 122 is in an open position. As a result, the heated airflow generated by the fire in the firebox 112 can travel readily into the oven 102 via the opening 126 between the firebox 112 and the oven 102 as shown by the dashed lines 142. Because the oven 102 is no longer a closed space when the oven lid 110 is open or the vent 122 is open, the heated airflow can travel into and through the interior of the oven 102 and out of the oven 102 via the opening 120. As a result, the interior of the oven 102 heats up and the temperature at the grill 140 is reduced. If the oven lid 110 and/or the vent 122 are configured to only a slightly open position, the airflow into the oven 102 is reduced and the temperature in the oven is correspondingly reduced. Conversely, if the oven lid 110 and/or the vent 122 are configured to a widely open position, the airflow into the oven 102 is increased and the temperature in the oven is correspondingly increased. In contrast, the temperature at the grill 140 is reduced if the oven lid 110 and/or the vent 122 are configured to a widely open position. The temperature at the grill 140 is increased if the oven lid 110 and/or the vent 122 are configured to a closed or a slightly open position. Thus, the movement of the oven lid 110 can be used to configure the temperature in the oven 102 and at the grill 140 at the same time. As described above, the grill and firebox portion 104 can be configured to include an adjustable vent opening 124 that can be opened or closed to provide a further means for adjusting the quantity of air that can enter the firebox 112 and flow into the oven 102. The opening on the top of the firebox 112 also provides a means for outside air to enter the firebox 112 and feed the fire therein. The opening on the top of the firebox 112 also provides a means for outside air to enter the firebox 112 and flow through to the oven 102 via the opening 126 between the firebox 112 and the oven 102, if the oven lid 110 is open or the vent 122 is open. As described herein, this heated airflow between the firebox 112 and the oven 102 enables the heat generated in the firebox 112 to be configurably transferred to the oven 102 and a desired cooking temperature to be achieved in the oven 102 and at the grill 140 by the operation of a few control features of the barbeque grill and oven 100 of an example embodiment as described herein. As a result, the operation of a few control features of the barbeque grill and oven 100 enables control of the size of the opening on the top of the oven 102 and the flow of heated air through the barbeque grill and oven 100. Thus, these control features allow a user to control the cooking temperature achieved in the oven 102. By controlling the cooking temperature achieved in the oven 102, the user can cook, bake, smoke, or heat a variety of food items in the oven 102. Additionally, these control features allow a user to control the cooking temperature achieved at the grill 140. By controlling the cooking temperature achieved at the grill 140, the user can sear meat or other food items directly over a fire below grill 140 that without the described control features would burn the food items. In other words, the described control features, with their ability to redirect the flames and heated air into the oven 102, allow a user to sear food items on the grill 140, which would otherwise burn. These features of the barbeque grill and oven 100 of an example embodiment as described herein enable a user to achieve a level of control over the cooking conditions in the oven and grill that existing systems do not provide.

Figure 9:
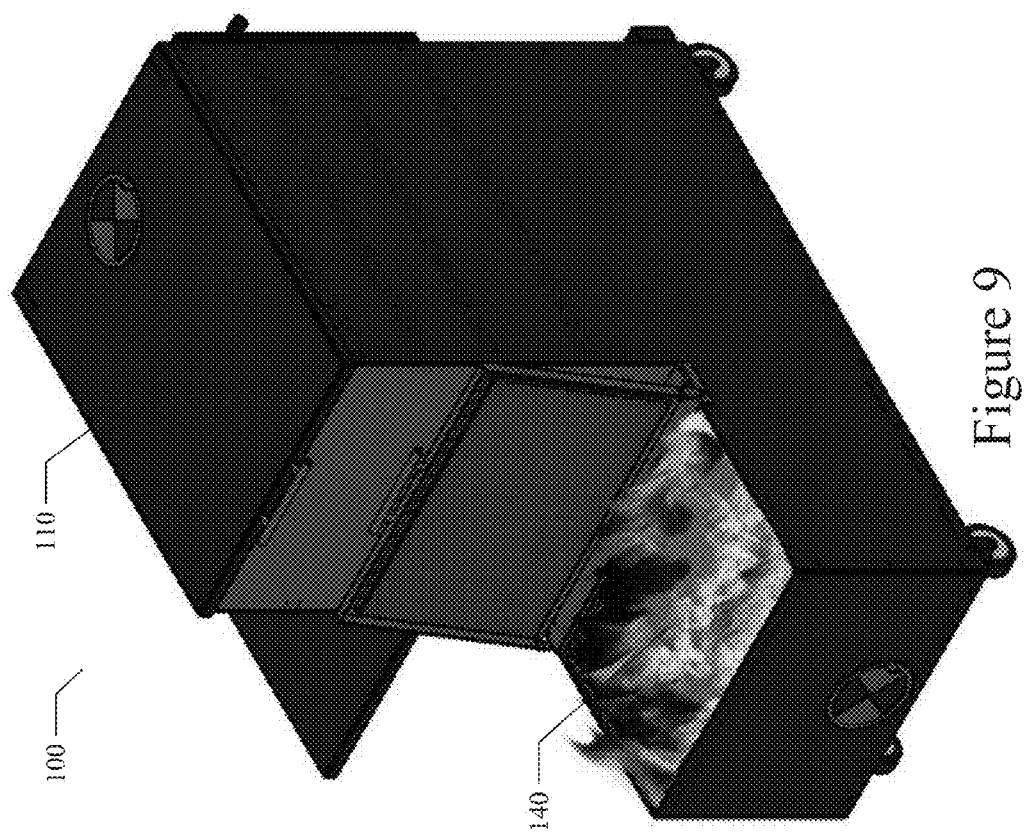
FIG. 9 illustrates a front perspective view of an example embodiment with the oven lid in a closed position and a fire in the offset firebox wherein air flow through the oven is disabled.

FIG. 9 illustrates a front perspective view of an example embodiment with the oven lid 110 in a closed position and a fire in the offset firebox 112 wherein air flow through the oven 102 is disabled. In the configuration shown in FIG. 9, a maximal cooking temperature is achieved at the grill 140 and a minimal cooking temperature is achieved in the oven 102; because the oven lid 110 is in a closed position and air flow through the oven 102 is disabled.

Figure 10:
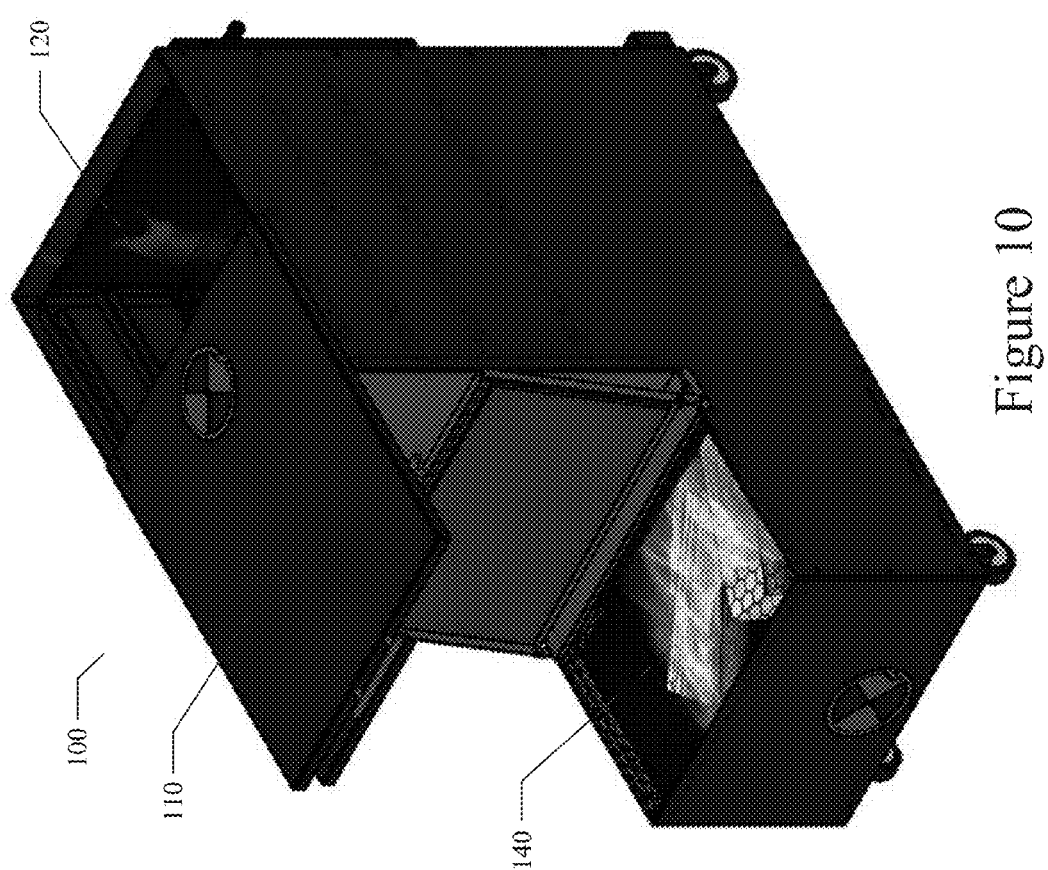
FIG. 10 illustrates a front perspective view of an example embodiment with the oven lid in an open position and a fire in the offset firebox wherein air flow through the oven is enabled.

FIG. 10 illustrates a front perspective view of an example embodiment with the oven lid 110 in an open position and a fire in the offset firebox 112 wherein air flow through the oven 102 is enabled. In the configuration shown in FIG. 10, a maximal cooking temperature is achieved in the oven 102 and a minimal cooking temperature is achieved at the grill 140; because the oven lid 110 is in an open position and air flow through the oven 102 is enabled.

In an example embodiment, the components of the barbeque grill and oven 100 can be fabricated from A36 hot rolled steel of a standard thickness and composition. The seams between panels can be welded. The rack supports and other attachable components can be stitch welded or attached using zinc-plated nuts and bolts. The components of the barbeque grill and oven 100 can be fabricated to be assembled on-site. The particular materials can be selected for a particular application based on a variety of factors including the desired size, temperature ranges, ambient weather, and the like.

Figure 11:
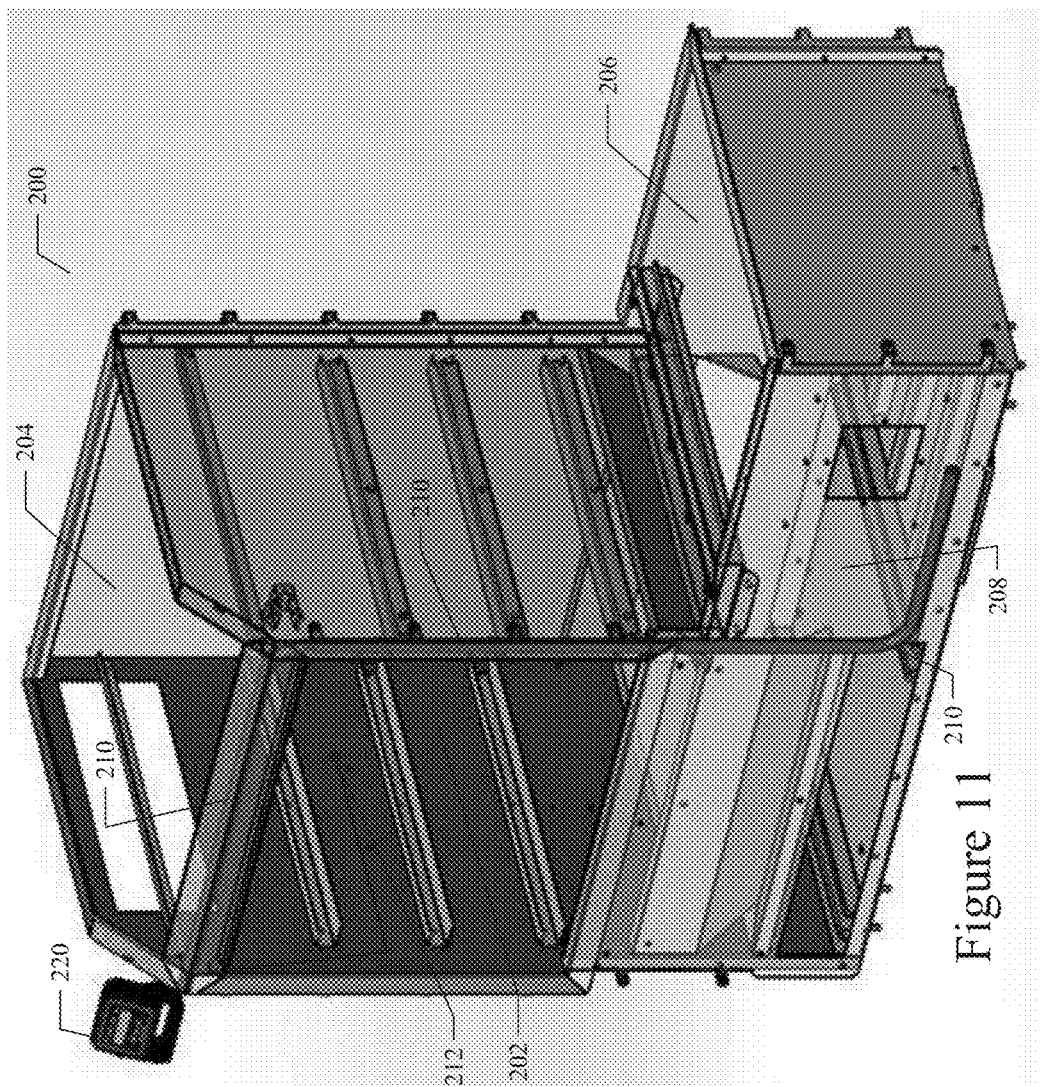
FIG. 11 illustrates a front perspective view of an example embodiment with the outer skin of the barbeque grill and oven removed to show the internal air-transferring conduit.

FIG. 11 illustrates a front perspective view of an example embodiment 200 with the outer skin of the barbeque grill and oven 200 removed to show the internal conduit 210 described in more detail below. In the barbeque grill and oven 200, the oven 202 can be enclosed with an oven lid (not shown), which is configured with hinges in the back to enable the oven lid to be lifted above the oven opening 204 instead of being horizontally slid across the oven opening as described above. The barbeque grill and oven 200 of the example embodiment includes an offset firebox 206 wherein air flow through the oven opening 204 is enabled when the oven lid is raised. Thus, in the manner as described above, the degree to which the oven lid is opened can be used to control the amount of air drawn into the oven 202 from the firebox 206. In the example embodiment 200, the hinged and liftable oven lid can increase the size of the oven opening 204 when the oven lid is lifted, thereby producing a variable size opening of any desired size at the top of the oven 202. The single action of opening the oven lid causes: 1) an increase in the flow of heated air from the offset firebox 206 into the oven 202 through a single fixed size air inlet 208 between the firebox 206 and the oven 202, 2) an increase in the oven 202 temperature, 3) a redirection of flames from the offset firebox 206 into the oven 202 through the single fixed size air inlet 208, and 4) a decrease in the temperature of a removable grill (not shown) above the firebox 206.

In the example embodiment 200 shown in FIG. 11, an electronic controller 220 is provided to control the temperature in both the firebox 206 and the oven 202. The controller 220 is an electrical device that can be powered by a battery or a wired plug. The controller 220 includes a temperature sensor unit, a fan or blower unit, and a display/user interface unit. The temperature sensor unit, which is remotely coupled to a temperature sensor or probe 212, is configured to sense a temperature at an element or probe on the temperature sensor 212 and to generate corresponding electrical signals. These sensor signals can be transferred from the temperature sensor 212 to the controller 220. The controller 220 can convert the signals to a corresponding temperature reading, which can be displayed on the display/user interface unit. The temperature reading can also be stored in a memory of the controller 220. The probe of the temperature sensor 212 can be placed anywhere in the interior of the oven 202 to sense the average temperature in the oven 202 at a particular point in time.

The fan or blower unit of controller 220 is coupled to a pre-installed, air transferring conduit 210. A fan or air-producing blower in controller 220 can generate an airflow from the controller 220, which is directed into an end of the conduit 210 coupled to the controller 220 as shown in FIG. 11. The airflow produced by the blower in controller 220 follows the air transferring conduit 210 to an output end positioned and terminating at a lower portion of the firebox 206 as shown in FIG. 11. The output end of the conduit 210 is positioned in the firebox 206 to fan or stoke the flames produced by the material burning in the firebox 206. As a result, the airflow emitted from the output or terminating end of the conduit 210 serves to increase the oxygen flow to the fire in the firebox 206, which increases the heat output of the fire. The controller 220, and the fan or blower unit therein, can thereby actively and automatically cause the fire in the firebox 206 to increase in size and heat output by generating an airflow from the controller 220 to the firebox 206 via conduit 210.

In an example embodiment, the conduit can be a ¾" or ⅞" fire or heat resistant (e.g., copper) tubing, which creates an air corridor from the controller 220 to the fire box 206. As shown in FIG. 11, the conduit 210 can be installed in the interior of the barbeque grill and oven 200, underneath the outer skin of the barbeque grill and oven 200. The conduit 210 can be sandwiched between the inner steel liner and the outer steel skin of the barbeque grill and oven 200. In this way, the conduit is hidden from view, protected by the outer skin, and does not distract from the clean lines of the barbeque and oven design. The conduit 210 allows the controller 220 to be remotely located relative to the firebox 206 and the output end or terminating end of the conduit 210.

As described above, the controller 220 can sense the temperature level in the oven 202 by use of the temperature sensor unit and the temperature sensor 212. An operator can use the display/user interface unit of the controller 220 to set a desired temperature to be maintained in the oven 202 by the controller 220. The desired temperature set by the operator can be stored in the memory of the controller 220. If the desired temperature is greater than the current temperature in the oven 202 as sensed by the temperature sensor unit and the temperature sensor 212, the controller 220 can automatically activate the fan or blower unit of controller 220 to start a flow of air through the conduit 210 to the firebox 206. As a result, the airflow from the conduit 210 stokes the fire in the firebox 206, which causes the fire to generate more heat. The increased heat is transferred from the firebox 206 through the single fixed size air inlet 208 and into the oven 202. This increase of heat entering the oven 202 serves to increase the temperature in the oven 202. The increased temperature of the oven 202 is sensed by the temperature sensor unit and the temperature sensor 212 of controller 220. As the current/actual temperature of the oven 202 approaches or reaches the desired temperature level set by the operator via the controller 220, the controller can automatically de-activate or reduce power to the fan or blower unit of controller 220 to terminate or reduce the flow of air through the conduit 210 to the firebox 206. In this manner, the controller 220 can actively and automatically drive the heat generated in the firebox 206 to control the temperature in the oven 202. The controller 220 can use the temperature sensed in the oven 202 as a feedback loop to determine how to control the fan or blower unit and the flow of air through the conduit 210. This method can be very effective for controlling an oven and grill that is heated using a live fire. In an example embodiment, the fan or blower unit of controller 220 can be a variable speed fan or blower, so the controller 220 can automatically use small changes in the level of airflow in the conduit 210 and achieve a high level of control over the temperature in the oven 202. In another embodiment, the controller 220 can be configured with an interface for a mobile device, such as a smartphone, so the temperature in the oven 202 can be monitored remotely and the desired temperature in the oven 202 can be controlled remotely.

Figure 12:
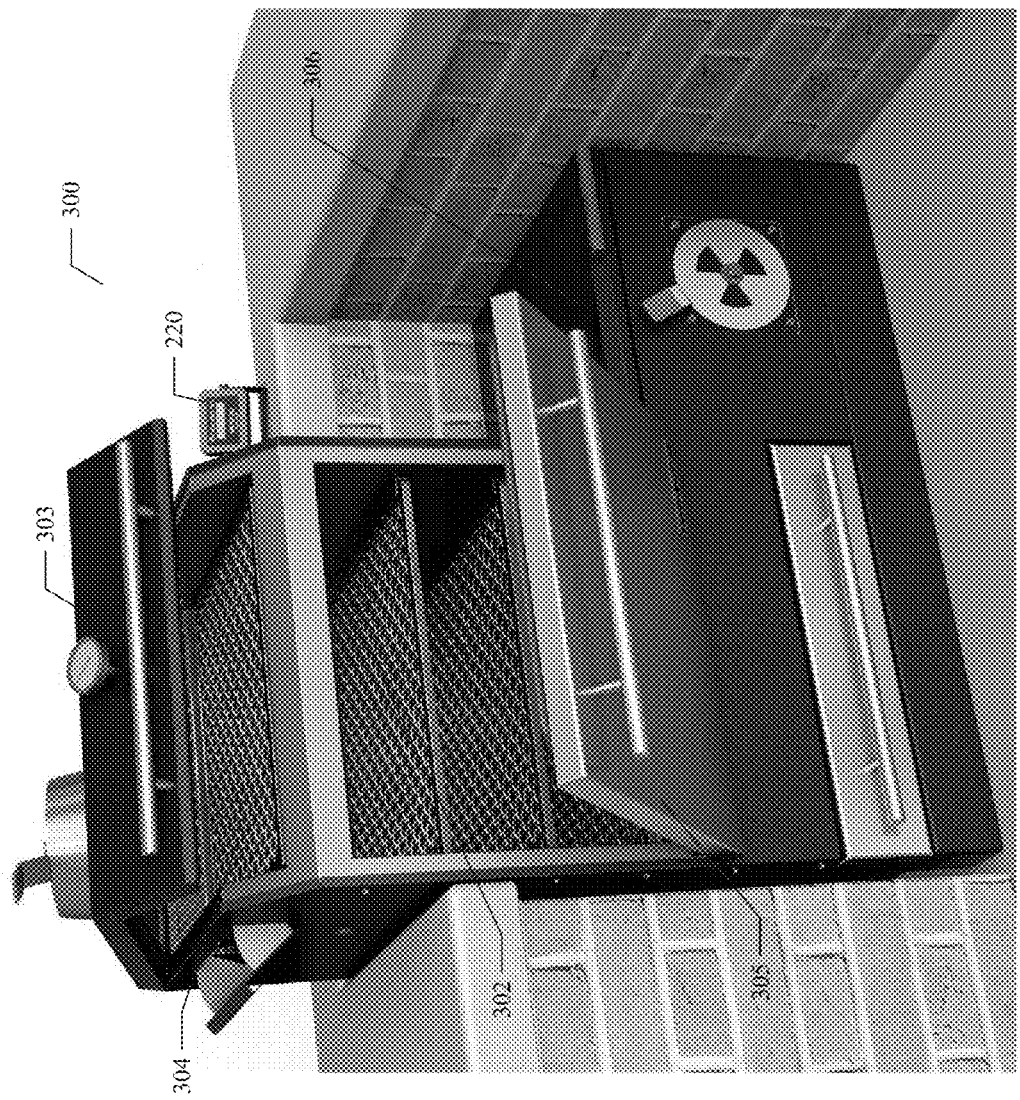
FIG. 12 illustrates a front perspective view of an example embodiment configured to be installed in an enclosure or configured for a wall mounted installation.

FIG. 12 illustrates a front perspective view of an example embodiment 300 configured to be installed in an enclosure or configured for a wall mounted installation. In the barbeque grill and oven 300, the oven 302 can be enclosed with a top oven lid 303, which is configured with hinges in the back to enable the top oven lid 303 to be lifted above the oven opening 304 instead of being horizontally slid across the oven opening as described above. The barbeque grill and oven 300 also provides a front oven door 305, which is configured with hinges on the bottom to enable the front oven door 305 to be opened forward of the oven opening 304 instead of being horizontally slid across the oven opening as described above. The barbeque grill and oven 300 of the example embodiment includes an offset firebox 306 wherein air flow through the oven opening 304 is enabled when the top oven lid 303 is raised or the front oven door 305 is opened. Thus, in the manner as described above, the degree to which the oven lid/door is opened can be used to control the amount of air drawn into the oven 302 from the firebox 306. In the example embodiment 300, the hinged top oven lid 303 and front oven door 305 can increase the size of the oven opening 304 when the oven lid/door is opened, thereby producing a variable size opening of any desired size at the top and front of the oven 302. The single action of opening either the top oven lid 303 or the front oven door 305 causes: 1) an increase in the flow of heated air from the offset firebox 306 into the oven 302 through a single fixed size air inlet between the firebox 306 and the oven 302, 2) an increase in the oven 302 temperature, and 3) a redirection of flames from the offset firebox 306 into the oven 302 through the single fixed size air inlet.

In the example embodiment 300 shown in FIG. 12, an electronic controller 220 is provided to control the temperature in both the firebox 306 and the oven 302 as described above. The example embodiment 300 also includes the temperature sensor and probe (not shown), which is coupled to the controller 220 to sense the temperature in the oven 302 as described above. The example embodiment 300 also includes the embedded conduit (not shown), which is configured in the manner described above to deliver a flow of air to the firebox 306 to stoke a fire therein. The example embodiment 300 shown in FIG. 12 is uniquely configured for easy installation in an enclosure or configured for a wall mounted installation.

Figure 13:
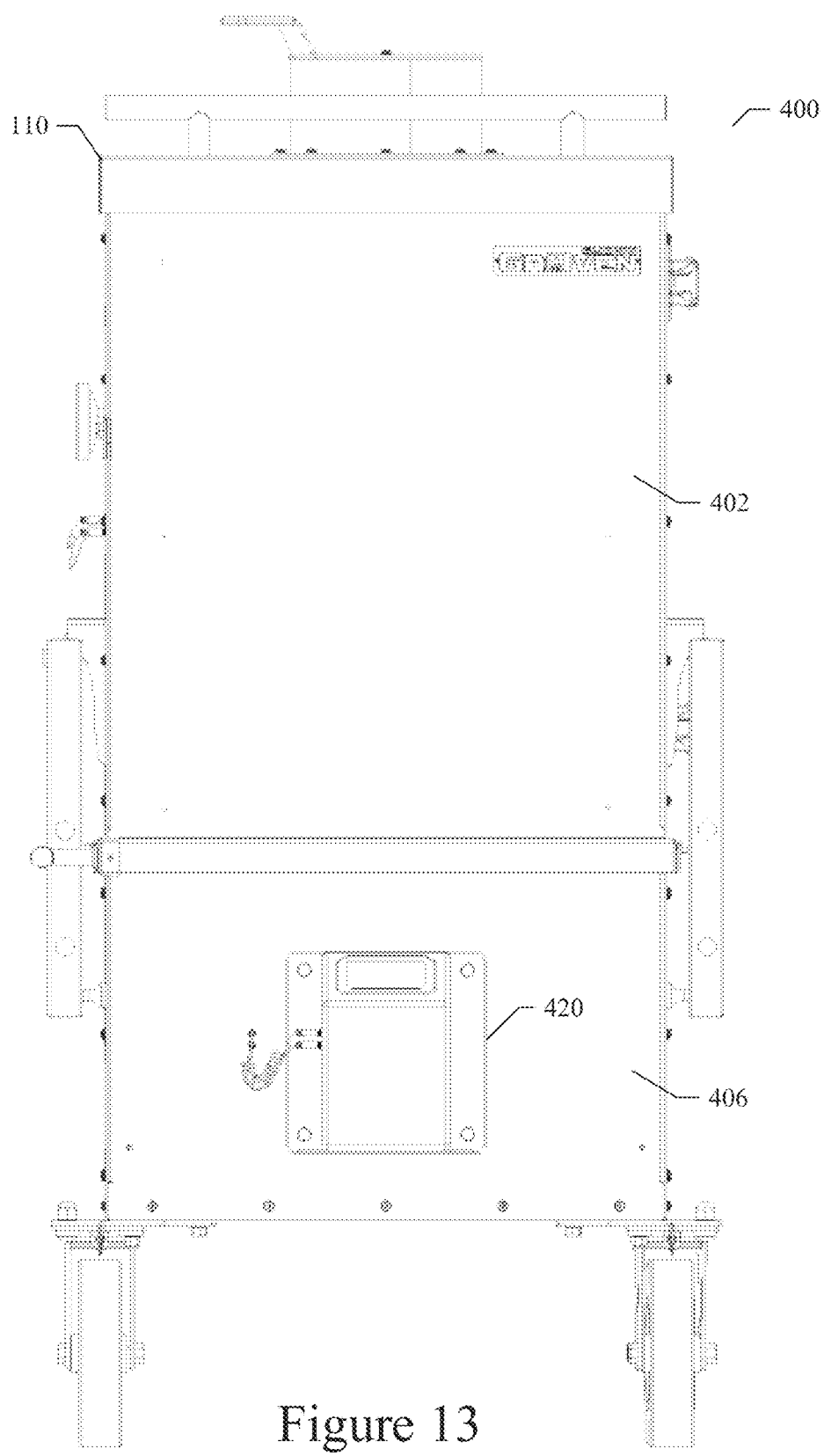
FIG. 13 illustrates a right side view of an example embodiment of the barbeque grill and oven.

FIG. 13 illustrates a right side view of an example embodiment 400 of the barbeque grill and oven.

Figure 14:
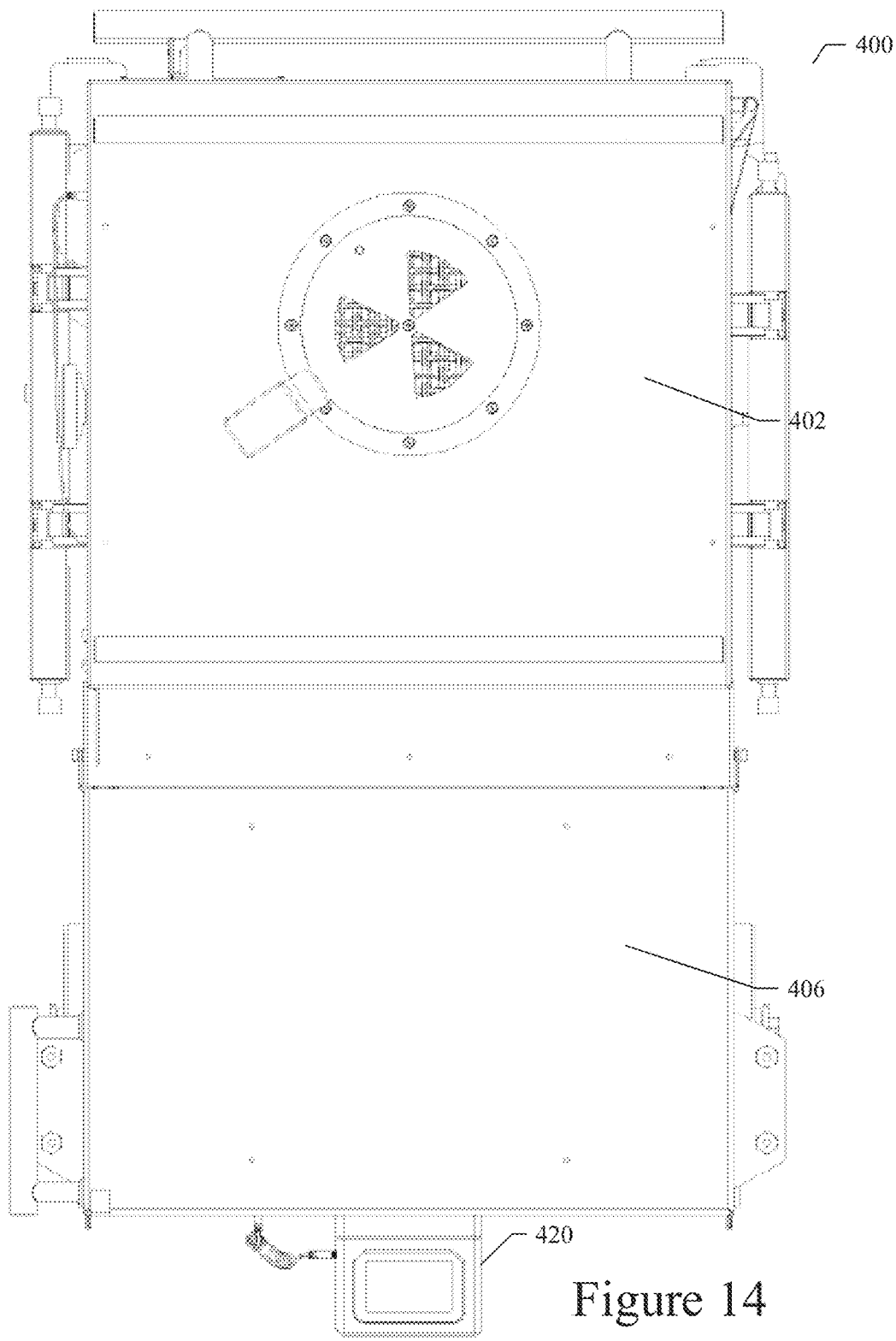
FIG. 14 illustrates a top view of an example embodiment of the barbeque grill and oven.

FIG. 14 illustrates a top view of an example embodiment 400 of the barbeque grill and oven.

Figure 15:
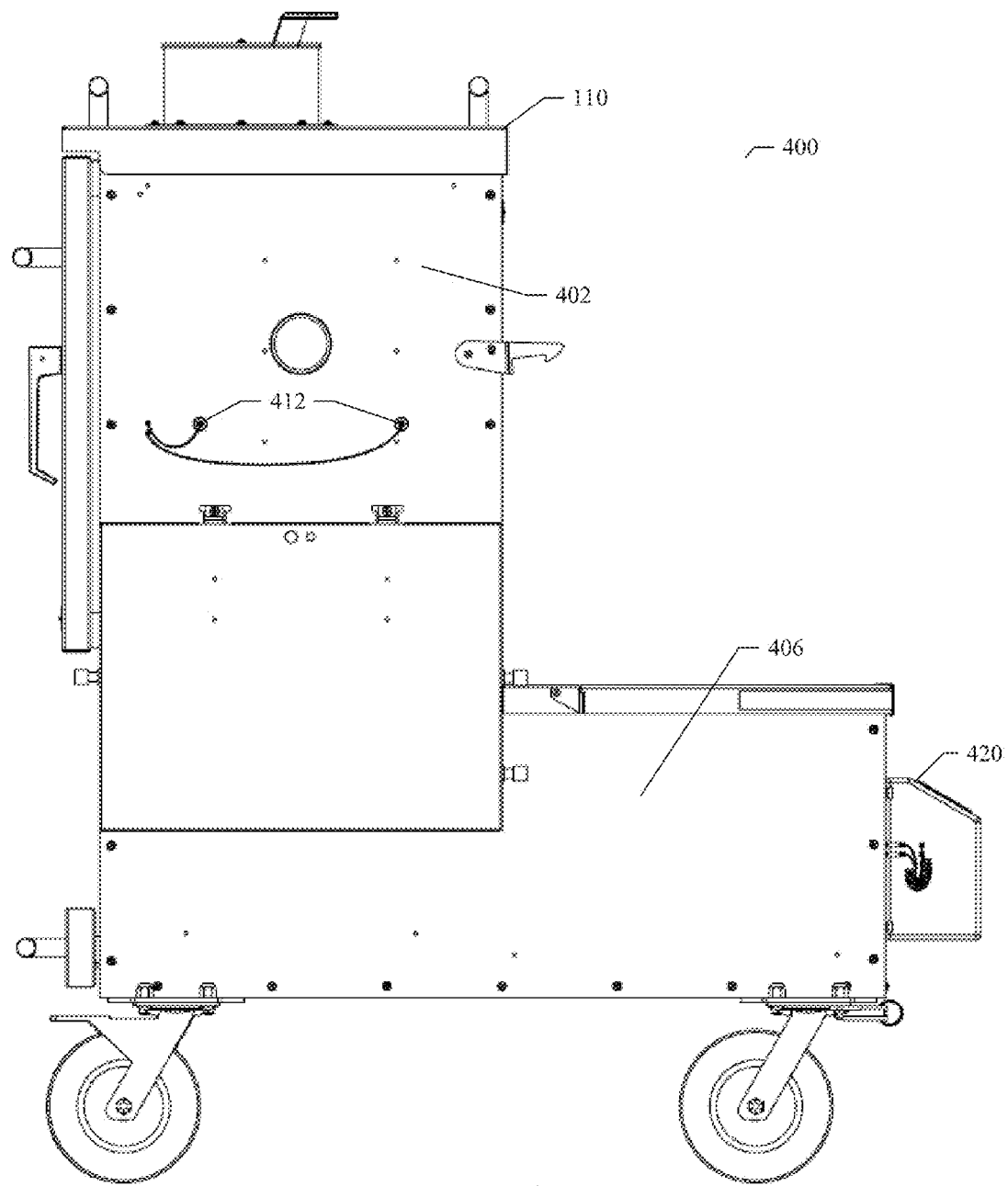
FIG. 15 illustrates a front view of an example embodiment of the barbeque grill and oven.

FIG. 15 illustrates a front view of an example embodiment 400 of the barbeque grill and oven.

Figure 16:
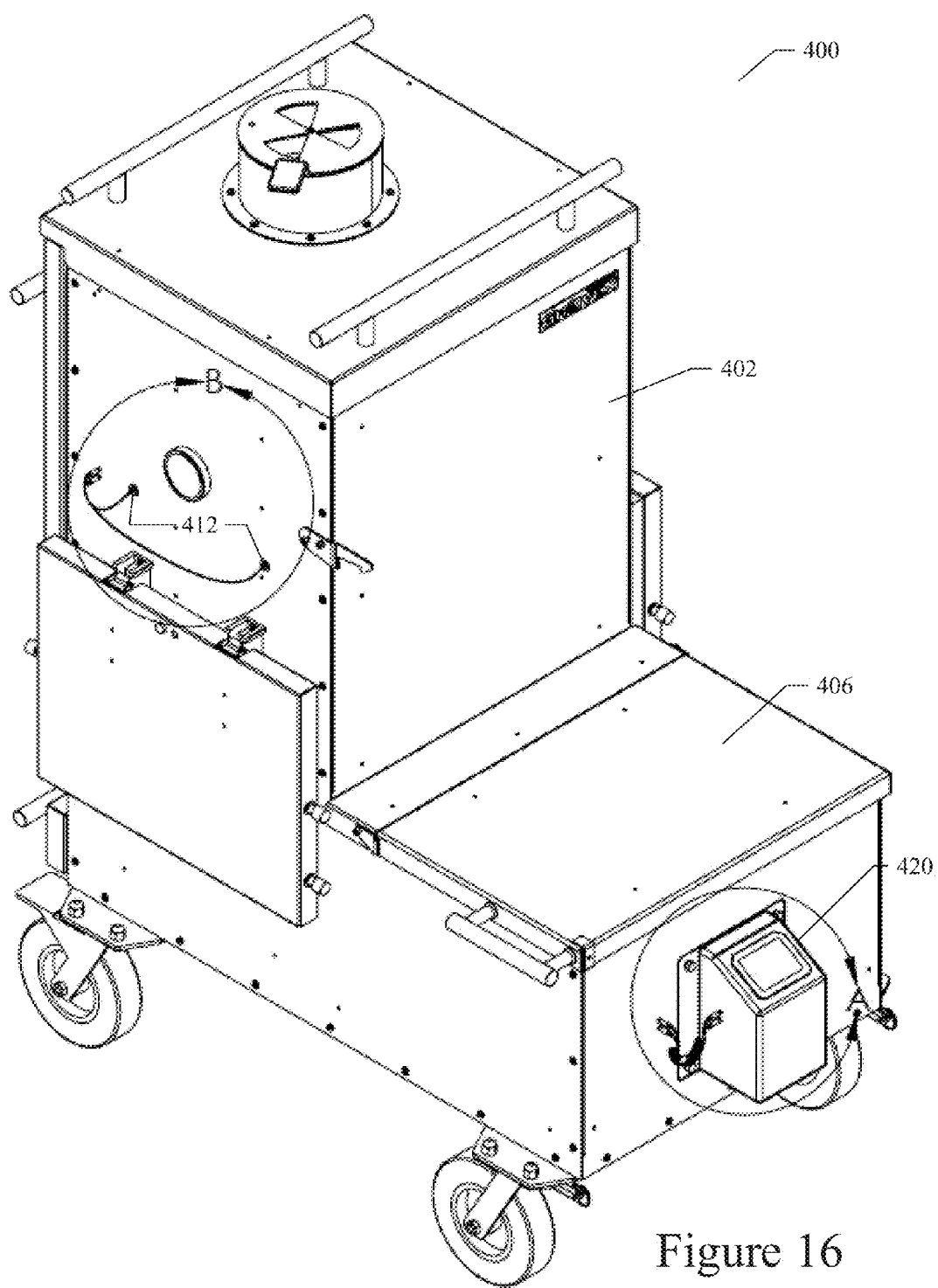
FIG. 16 illustrates a front, top, and right side perspective view of an example embodiment of the barbeque grill and oven.

FIG. 16 illustrates a front, top, and right side perspective view of an example embodiment 400 of the barbeque grill and oven.

Figure 17:
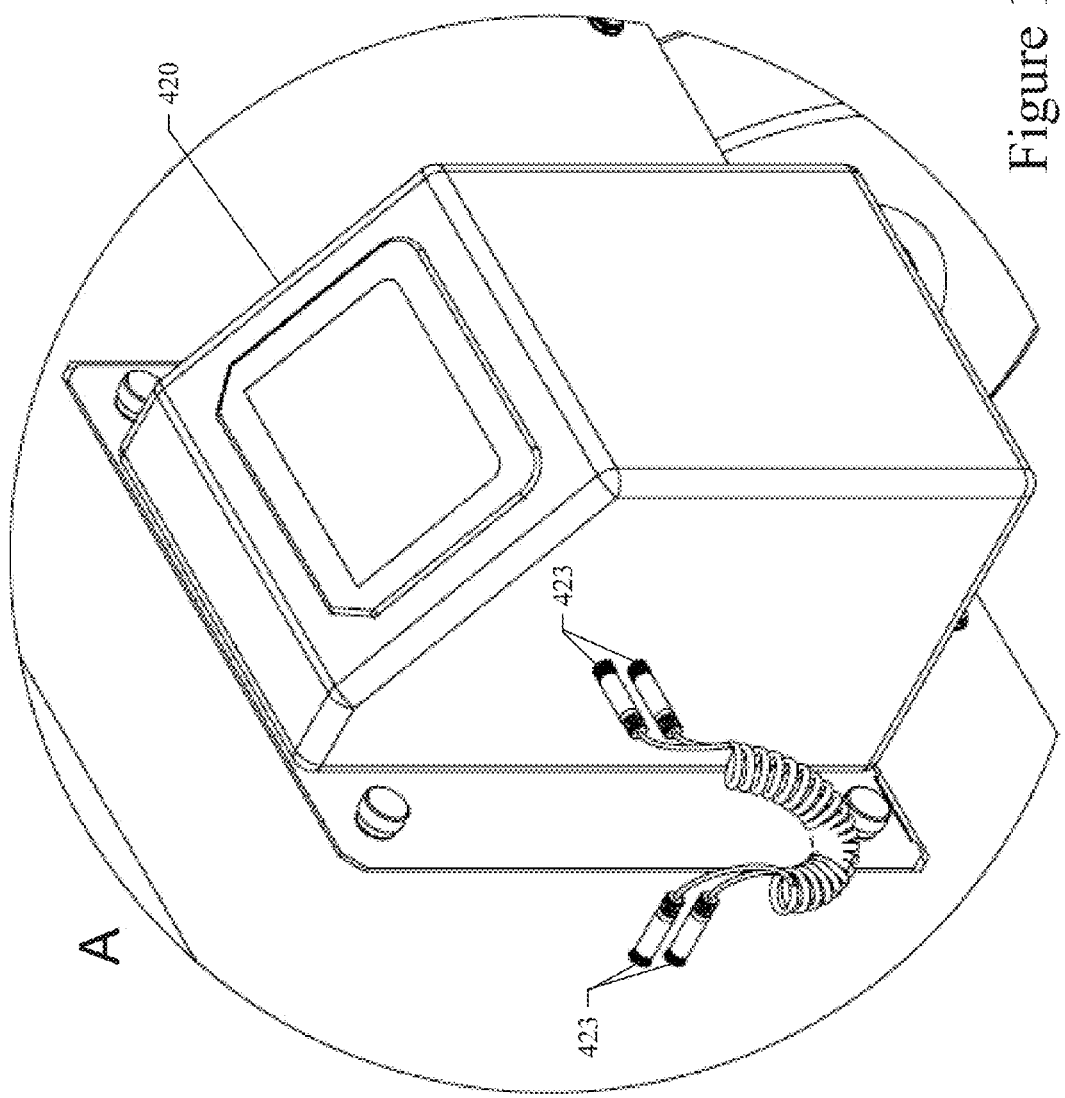
FIG. 17 illustrates a detail of the firebox-mounted controller of an example embodiment of the barbeque grill and oven.

FIG. 17 illustrates a detail of the firebox-mounted controller of an example embodiment 400 of the barbeque grill and oven.

Figure 18:
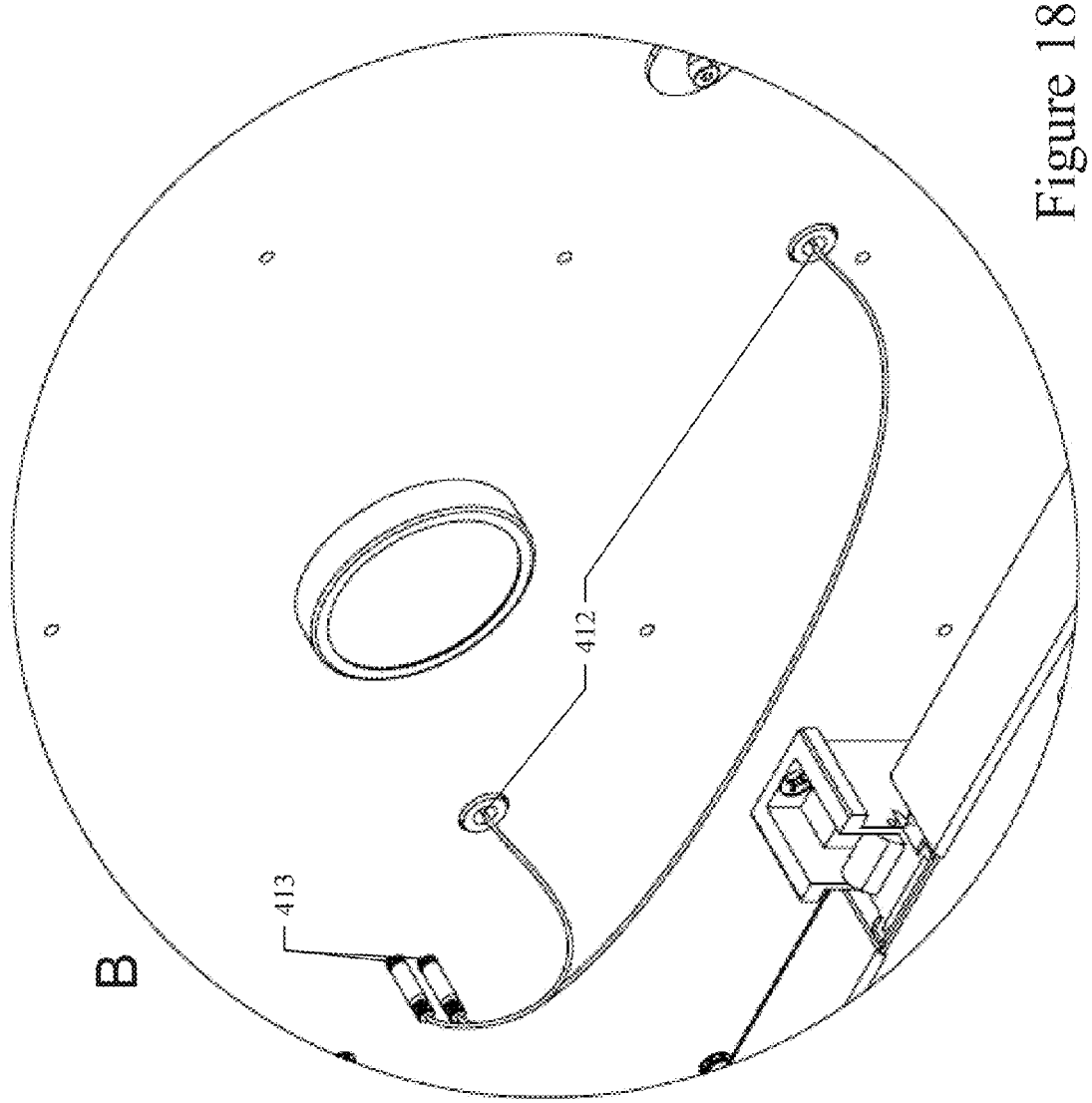
FIG. 18 illustrates a detail of the oven probes of an example embodiment of the barbeque grill and oven.

FIG. 18 illustrates a detail of the oven probes of an example embodiment 400 of the barbeque grill and oven.

Figure 19:
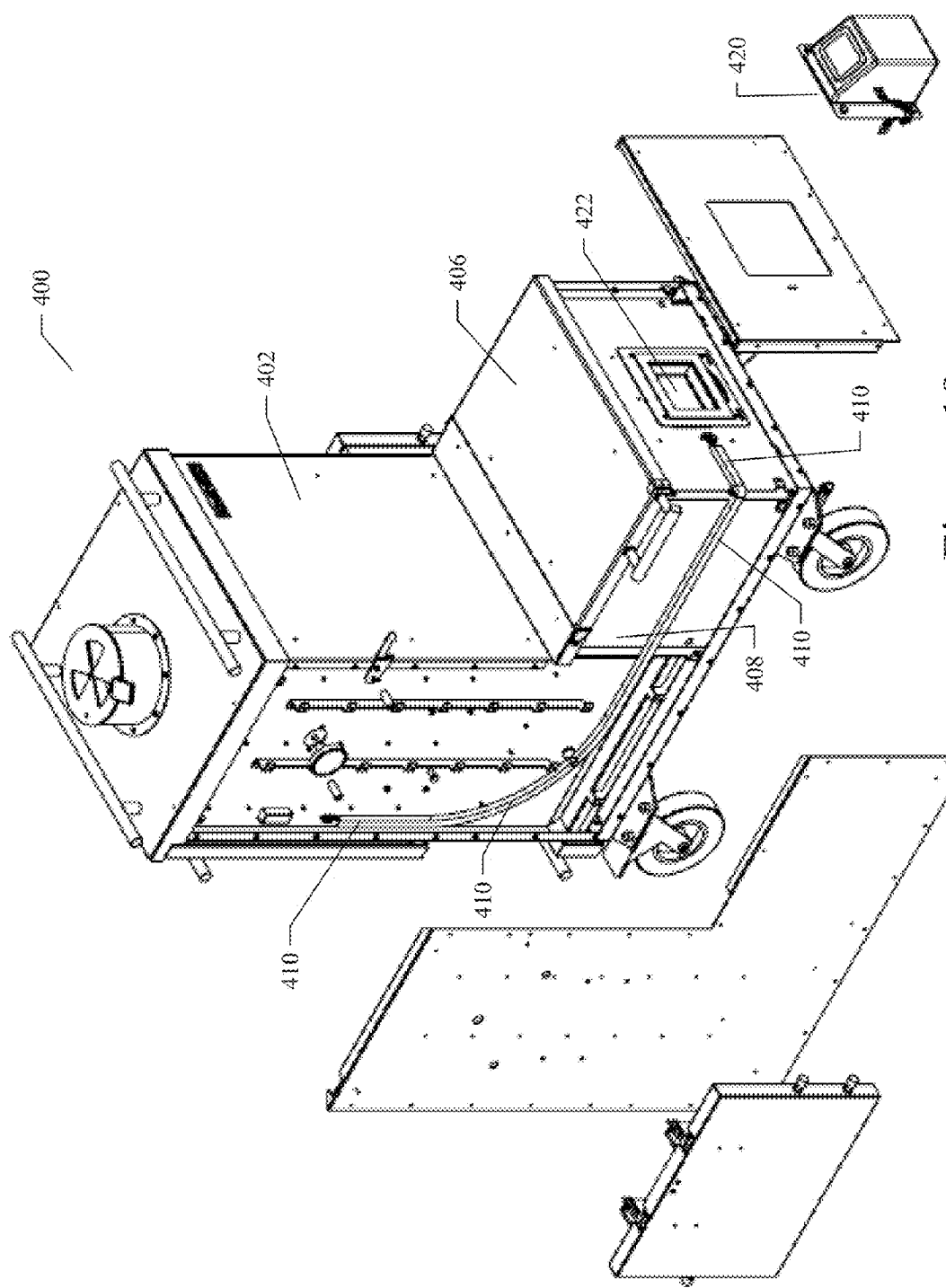
FIG. 19 illustrates a front, top, and right side perspective exploded view of an example embodiment with the outer skin of the barbeque grill and oven removed to show the internal conduit.

FIG. 19 illustrates a front, top, and right side perspective exploded view of an example embodiment 400 with the outer skin of the barbeque grill and oven 400 removed to show the internal conduit 410 described in more detail below. As shown in FIGS. 13 through 19, the example embodiment of the barbeque grill and oven 400 includes an oven 402 and an offset firebox 406 wherein air flow through an oven opening is enabled when the oven lid 110 is raised or slid horizontally. Thus, in the manner as described above, the degree to which the oven lid 110 is opened can be used to control the amount of air drawn into the oven 402 from the firebox 406.

In the example embodiment 400 shown in FIGS. 13 through 19, an electronic controller 420 is provided to control the temperature in both the firebox 406 and the oven 402. The controller 420 is an electrical device that can be powered by a battery or a wired plug. The controller 420 can include a temperature sensor unit, a fan or blower unit, and a display/user interface unit. The temperature sensor unit, which can be remotely coupled to one or more temperature sensors or probes 412, is configured to sense a temperature at an element or probe on the temperature sensor 412 and to generate corresponding electrical signals. These sensor signals can be transferred from the temperature sensor 412 to the controller 420 via the conduit 410. The controller 420 can convert the signals to a corresponding temperature reading, which can be displayed on the display/user interface unit. The temperature reading can also be stored in a memory of the controller 420. The probes of the temperature sensors 412 can be placed anywhere in the interior of the oven 402 and/or inside a food item being cooked in the oven 402 to sense the average temperature in the oven 402 or in the food item at a particular point in time.

The fan or blower unit of controller 420 can be integrated into or coupled to the controller 420. In the configuration 400 shown in FIGS. 13 through 19, the controller 420 including the fan or blower unit is installed in a hole 422 provided in the firebox 406 as shown in FIG. 19. A fan or air-producing blower in controller 420 can generate an airflow from the controller 420, which is directed to a lower portion of the firebox 406 as shown in FIG. 19. The airflow from the fan or air-producing blower in controller 420 serves to fan or stoke the flames produced by the material burning in the firebox 406. As a result, the airflow emitted from the fan or air-producing blower in controller 420 serves to increase the oxygen flow to the fire in the firebox 406, which increases the heat output of the fire. The controller 420, and the fan or blower unit therein, can thereby actively and automatically cause the fire in the firebox 406 to increase in size and heat output by generating an airflow from the controller 420 to the firebox 406.

In an example embodiment, the conduit 410 can be fire or heat resistant electrical (e.g., copper) wiring, which creates an electrical signal path from the controller 420 to the sensor probes 412. The sensor probes 412 can be removably connected to the conduit 410 via electrical connectors 413. Similarly, the controller 420 can be removably connected to the conduit 410 via electrical connectors 423. As shown in FIG. 19, the conduit 410 can be installed in the interior of the barbeque grill and oven 400, underneath the outer skin of the barbeque grill and oven 400. The conduit 410 can be sandwiched between the inner steel liner and the outer steel skin of the barbeque grill and oven 400. In this way, the conduit is hidden from view, protected by the outer skin, and does not distract from the clean lines of the barbeque and oven design. The conduit 410 allows the controller 420 to be remotely located relative to the oven 402 and the temperature probes 412.

As described above, the controller 420 can sense the temperature level in the oven 402 by use of the temperature sensor unit and the temperature sensors 412. An operator can use the display/user interface unit of the controller 420 to set a desired temperature to be maintained in the oven 402 by the controller 420. The desired temperature set by the operator can be stored in the memory of the controller 420. If the desired temperature is greater than the current temperature in the oven 402 as sensed by the temperature sensor unit and the temperature sensors 412, the controller 420 can automatically activate the fan or blower unit of controller 420 to start a flow of air into the firebox 406. As a result, the airflow from the fan or blower unit of controller 420 stokes the fire in the firebox 406, which causes the fire to generate more heat. The increased heat is transferred from the firebox 406 through the single fixed size air inlet 408 and into the oven 402. This increase of heat entering the oven 402 serves to increase the temperature in the oven 402. The increased temperature of the oven 402 is sensed by the temperature sensor unit and the temperature sensors 412 of controller 420. As the current/actual temperature of the oven 402 approaches or reaches the desired temperature level set by the operator via the controller 420, the controller 420 can automatically de-activate or reduce power to the fan or blower unit of controller 420 to terminate or reduce the flow of air into the firebox 406. In this manner, the controller 420 can actively and automatically drive the heat generated in the firebox 406 to control the temperature in the oven 402. The controller 420 can use the temperature sensed in the oven 402 or food items cooking therein as a feedback loop to determine how to control the fan or blower unit and the flow of air generated by the controller 420. This method can be very effective for controlling an oven and grill that is heated using a live fire. In an example embodiment, the fan or blower unit of controller 420 can be a variable speed fan or blower, so the controller 420 can automatically use small changes in the level of airflow to achieve a high level of control over the temperature in the oven 402 or food items cooking therein. In another embodiment, the controller 420 can be configured with an interface for a mobile device, such as a smartphone, so the temperature in the oven 402 or food items cooking therein can be monitored remotely and the desired temperature in the oven 402 or food items cooking therein can be controlled remotely.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

Thus, a barbeque grill and oven or food smoker having an offset firebox configuration is disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. An apparatus comprising:
   an oven having an enclosed interior region for cooking food items;
   an offset firebox sharing at least a portion of a side of the oven, the offset firebox having a first opening over which a removable grill may be placed on which food may be grilled, the firebox having a second opening through which airflow may travel from the firebox into the oven;
   an oven lid configured to produce and sustain a variable size opening in the top of the oven, the variable size opening of the oven lid causing a corresponding variation in the flow of heated air from the firebox into the oven; and
   a controller coupled to a temperature sensor via an electrical conduit, the temperature sensor being located in the oven to measure a temperature in the oven, the controller including a blower unit to deliver an airflow to stoke a fire in the offset firebox, the controller being configured to automatically generate the airflow to drive the temperature in the oven to a desired temperature as measured by the temperature sensor, the conduit being installed between an inner surface of the oven and an outer surface of the oven to hide the conduit from view, the temperature sensor being removably coupled to the conduit via electrical connectors, the controller being removably coupled to the conduit via electrical connectors.

2. The apparatus of claim 1 wherein the closing of the oven lid causing a decrease in the flow of heated air from the firebox into the oven.

3. The apparatus of claim 1 wherein the oven includes rack supports therein to support one or more removable grills, grates, or racks in the interior enclosure of the oven.

4. The apparatus of claim 1 wherein the oven includes rack supports therein to support one or more removable hangars for hanging food items in the in the interior enclosure of the oven.

5. The apparatus of claim 1 wherein the oven lid includes an adjustable vent opening that can be opened or closed independently of a position of the oven lid.

6. The apparatus of claim 1 wherein the offset firebox includes an adjustable vent opening that can be opened or closed.

7. The apparatus of claim 1 wherein the controller is electrically powered by a battery or a wired plug.

8. The apparatus of claim 1 wherein the controller includes a display/user interface with which an operator can enter the desired temperature.

9. The apparatus of claim 1 wherein the conduit is embedded between layers of the apparatus.

10. The apparatus of claim 1 wherein the controller includes an interface for a mobile device enabling the mobile device to remotely control the controller.

11. The apparatus of claim 1 wherein the apparatus is configured for a wall mounted installation by being configured with hinges in the back of the oven lid to enable the oven lid to be lifted above the opening in the top of the oven, and configured with a front oven door having hinges on the bottom to enable the front oven door to be opened forward of the oven.

12. An apparatus comprising:

an oven having a first enclosed interior region for cooking food items, the first enclosed interior region being defined by four vertical oven sides joined at edges of each vertical oven side, a first vertical oven side including a single fixed size air inlet at a lower portion of the first vertical oven side, the size of the air inlet at the lower portion of the first vertical oven side not being adjustable, a second vertical oven side including a door hinged at a lower edge to enable the door to open outwardly and downwardly for access to the first enclosed interior region, the second vertical oven side further including a trap drawer at a lower portion of the second vertical oven side, the trap drawer including a first slide mechanism to enable the trap drawer to slide horizontally out from the second vertical oven side for access to a grease trap in the trap drawer, the oven having a first opening at the top of the first enclosed interior region;

an offset firebox having a second enclosed interior region for containing a fire, the second enclosed interior region being defined by three vertical firebox sides joined at edges of each vertical firebox side, a fourth vertical firebox side corresponding to the single fixed size air inlet at the lower portion of the first vertical oven side, the volumetric dimension of the first enclosed interior region being larger than the volumetric dimension of the second enclosed interior region, the offset firebox having a second opening at the top of the second enclosed interior region over which a removable grill is placed, the fourth vertical firebox side of the offset firebox providing the single fixed size air inlet through which airflow travels from outside, through the removable grill, into the second enclosed interior region, through the single fixed size air inlet, and into the first enclosed interior region of the oven; and an oven lid having a second slide mechanism, coupled to edges of at least two of the four vertical oven sides, to enable the oven lid to slide horizontally across the first opening at the top of the first enclosed interior region to produce a variable size opening at the top of the oven, the variable size opening being changeable through a horizontal sliding motion of the oven lid, the single action of opening the oven lid causing: 1) an increase in the flow of heated air from the offset firebox into the oven through the single fixed size air inlet, 2) an increase in the oven temperature, 3) a redirection of flames from the offset firebox into the oven through the single fixed size air inlet, and 4) a decrease in the temperature of the removable grill; and a controller coupled to a temperature sensor and an airflow conduit, the temperature sensor being terminated at a location in the oven to sense a temperature in the oven, the conduit being terminated at the offset firebox to deliver an airflow to stoke a fire in the offset firebox, the controller being configured to automatically generate an airflow in the conduit to drive the temperature in the oven to a desired temperature.

13. The apparatus of claim 12 wherein the closing of the oven lid causing a decrease in the flow of heated air from the firebox into the oven.

14. The apparatus of claim 12 wherein the oven includes rack supports therein to support one or more removable grills, grates, or racks in the interior enclosure of the oven.

15. The apparatus of claim 12 wherein the oven includes rack supports therein to support one or more removable hangars for hanging food items in the in the interior enclosure of the oven.

16. The apparatus of claim 12 wherein the controller is electrically powered by a battery or a wired plug.

17. The apparatus of claim 12 wherein the controller includes a display/user interface with which an operator can enter the desired temperature.

18. The apparatus of claim 12 wherein the conduit is embedded between layers of the apparatus.

19. The apparatus of claim 12 wherein the controller includes an interface for a mobile device enabling the mobile device to remotely control the controller.

20. The apparatus of claim 12 wherein the apparatus is configured for a wall mounted installation by being configured with hinges in the back of the oven lid to enable the oven lid to be lifted above the opening in the top of the oven, and configured with a front oven door having hinges on the bottom to enable the front oven door to be opened forward of the oven.

* * * * *